US012601201B2

(12) United States Patent
Webb

(10) Patent No.: US 12,601,201 B2
(45) Date of Patent: Apr. 14, 2026

(54) SURFACE MOUNTED ELECTRIC STRIKE

(71) Applicant: Hanchett Entry Systems, Inc., Phoenix, AZ (US)

(72) Inventor: Brendan A. Webb, Gilbert, AZ (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 91 days.

(21) Appl. No.: 18/442,472

(22) Filed: Feb. 15, 2024

(65) Prior Publication Data

US 2024/0183199 A1 Jun. 6, 2024

Related U.S. Application Data

(63) Continuation-in-part of application No. 18/426,639, filed on Jan. 30, 2024, which is a continuation of (Continued)

(51) Int. Cl.
*E05B 47/00* (2006.01)

(52) U.S. Cl.
CPC .. *E05B 47/0047* (2013.01); *E05B 2047/0081* (2013.01)

(58) Field of Classification Search
CPC ............ E05B 47/0047; E05B 47/0046; E05B 47/0004; E05B 47/0696; E05B 2047/0081; E05B 2047/0024; E05B 1/0015; E05B 63/248; E05B 65/1026; E05B 85/02; E05B 85/04; E05B 15/022; E05B 77/38;

(Continued)

(56) References Cited

U.S. PATENT DOCUMENTS

| | | | |
|---|---|---|---|
| 1,059,530 A | 4/1913 | Dupuis | |
| 1,214,227 A | 1/1917 | Schwenk | |

(Continued)

FOREIGN PATENT DOCUMENTS

| | | | |
|---|---|---|---|
| AT | 398223 | 10/1994 | |
| AU | 2003271459 A1 * | 4/2004 | ......... E05B 47/0047 |

(Continued)

OTHER PUBLICATIONS

WO_2011107286_A1 Espacenet machine translation claims and description (Year: 2025).*

(Continued)

*Primary Examiner* — Steven A Tullia
(74) *Attorney, Agent, or Firm* — Woods Oviatt Gilman LLP; Dennis B. Danella, Esq.

(57) ABSTRACT

A modular surface mounted electric strike system for use with a door latch assembly to selectively secure a door in a closed position within a door frame is provided. The system includes a base plate configured to be mounted to a surface of the door frame. The base plate includes at least one slot extending along a longitudinal axis of the base plate. An electric strike module has a keeper and a housing to receive a door latch of the door latch assembly. The electric strike module includes a mating feature configured to engage the slot to position the electric strike module along the longitudinal axis of the base plate. The electric strike module is configured to be fixedly positioned to the base plate. The keeper is positioned on the base plate to align with the door latch when the door is in the closed position.

18 Claims, 30 Drawing Sheets

Related U.S. Application Data application No. 17/841,019, filed on Jun. 15, 2022, now Pat. No. 11,885,154.

(58) Field of Classification Search
CPC .. E05B 77/136; E05B 17/045; Y10T 292/699; E05C 7/00
See application file for complete search history.

(56) References Cited

U.S. PATENT DOCUMENTS

| | | | | |
|---|---|---|---|---|
| 1,250,650 | A | 12/1917 | Pilchard | |
| 1,529,276 | A | 3/1925 | Rich | |
| 2,572,428 | A | 10/1951 | Anstine | |
| 4,867,496 | A | 9/1989 | Thomas | |
| 5,076,625 | A * | 12/1991 | Oxley | E05B 47/0047 292/201 |
| 5,171,050 | A | 12/1992 | Mascotte | |
| 6,005,306 | A | 12/1999 | Pickard | |
| 6,082,791 | A * | 7/2000 | Frolov | E05B 47/0047 292/201 |
| 6,390,520 | B1 * | 5/2002 | Holzer | E05B 47/0046 292/341.16 |
| 6,581,991 | B2 | 6/2003 | Galindo | |
| 6,926,318 | B2 | 8/2005 | Oxley | |
| 7,000,959 | B2 * | 2/2006 | Sanders | E05B 15/0245 292/341.19 |
| 7,021,684 | B2 * | 4/2006 | Orbeta | E05B 47/0046 292/201 |
| 7,207,608 | B2 | 4/2007 | Monts de Oca | |
| 7,438,335 | B1 * | 10/2008 | Uyeda | E05B 47/0046 292/341.15 |
| 8,047,585 | B1 * | 11/2011 | Peabody | E05B 47/0046 292/341.15 |
| 8,096,594 | B2 * | 1/2012 | Uyeda | E05B 47/0046 292/341.15 |
| 8,439,410 | B2 * | 5/2013 | Sauder | E06B 1/603 292/341.19 |
| 8,454,063 | B2 * | 6/2013 | David | E05B 47/0046 292/341.15 |
| 9,376,835 | B2 * | 6/2016 | Schildwachter | E05B 17/06 |
| 9,617,755 | B2 * | 4/2017 | Peabody | E05B 47/0046 |
| 9,702,167 | B2 * | 7/2017 | Liao | E05B 47/0046 |
| 10,697,202 | B2 * | 6/2020 | Geringer | E05B 47/0603 |
| 10,988,959 | B1 * | 4/2021 | Martin | E05B 47/0046 |
| 11,408,204 | B2 * | 8/2022 | Peabody | E05B 15/0205 |
| 11,542,726 | B2 * | 1/2023 | Moen | E05B 47/0047 |
| 11,549,282 | B2 * | 1/2023 | Martin | E05B 47/0046 |
| 11,959,310 | B2 * | 4/2024 | Singh | E05B 47/0046 |
| 2004/0212197 | A1 | 10/2004 | Shoemaker | |
| 2005/0034494 | A1 | 2/2005 | Meier et al. | |
| 2010/0038920 | A1 | 2/2010 | Tsai | |
| 2010/0269431 | A1 | 10/2010 | Young | |
| 2015/0130195 | A1 * | 5/2015 | Liao | E05B 47/0004 292/194 |
| 2015/0308167 | A1 * | 10/2015 | Chang | E05B 47/06 292/214 |
| 2020/0181947 | A1 | 6/2020 | Arlinghaus | |
| 2021/0102405 | A1 * | 4/2021 | Liao | E05B 47/0046 |
| 2022/0098899 | A1 * | 3/2022 | Chang | E05B 47/0046 |
| 2022/0098900 | A1 * | 3/2022 | Chang | E05B 47/023 |

FOREIGN PATENT DOCUMENTS

| | | | | |
|---|---|---|---|---|
| DE | 19642924 | | 4/1998 | |
| DE | 20003401 | U1 * | 8/2000 | E05B 17/0045 |
| DE | 102006011085 | | 3/2007 | |
| DE | 202008009683 | | 10/2008 | |
| DE | 202008015517 | U1 * | 2/2009 | E05C 9/1808 |
| DE | 202010013081 | | 4/2011 | |
| DE | 102012111085 | | 5/2013 | |
| DE | 202016101097 | | 3/2017 | |
| DE | 102012025237 | | 7/2018 | |
| EP | 0841447 | | 9/1997 | |
| EP | 978612 | | 2/2000 | |
| EP | 1700981 | | 9/2006 | |
| EP | 1950364 | | 7/2008 | |
| EP | 2472042 | | 7/2012 | |
| EP | 3168394 | | 5/2017 | |
| EP | 3263808 | | 1/2018 | |
| EP | 3628801 | | 4/2020 | |
| FR | 1338539 | | 9/1963 | |
| FR | 2677067 | | 12/1992 | |
| FR | 2922933 | | 5/2009 | |
| GB | 2525628 | A * | 11/2015 | E05B 47/0046 |
| WO | 2011107286 | | 9/2011 | |
| WO | 2011107288 | | 9/2011 | |
| WO | WO-2011107286 | A1 * | 9/2011 | E05B 47/0038 |
| WO | 2015124929 | | 8/2015 | |
| WO | 2018005075 | | 1/2018 | |

OTHER PUBLICATIONS

"Partial Search Report", European Patent Application No. 25168334.8 filed on Jun. 15, 2023, mailed on Jul. 8, 2025, London, England.

* cited by examiner

SURFACE MOUNTED ELECTRIC STRIKE

CROSS-REFERENCE TO RELATED APPLICATIONS

This application is a continuation-in-part of U.S. patent application Ser. No. 18/426,639, filed Jan. 30, 2024, which is a continuation of U.S. patent application Ser. No. 17/841,019, filed Jun. 15, 2022, now U.S. Pat. No. 11,885,154, the contents of which are hereby incorporated by reference in their entirety.

TECHNICAL FIELD

The present invention relates to a surface mounted electric locking device for securing a door to a door frame in a closed position; particularly to a surface mounted electric strike that may be used in conjunction with side-by-side swinging doors; and more particularly, to an overhead surface mounted electric strike for framed or frameless glass doors that does not require extensive modification of the door frame during installation of the electric strike. Also provided is a modular and/or adjustably positionable surface mounted electric strike that can be adapted for use with various spaced door latches.

BACKGROUND OF THE INVENTION

Door locking devices are widely used in many different types of applications. Certain types of door locking devices include a strike mounted to a door frame, wherein the strike defines a cavity within which a door latch may reside to selectively maintain the door is in a closed position. The strike can be installed in different points along the door frame depending on the location of the door latch. There are certain door types for example, double doors without a mullion or full-glass (frame-less) doors where the door locking device interacts with a strike mounted above the door in the header, in the floor below the door or both. In either of these instances, the strike may be mounted to the upper horizontal portion of the door frame (i.e., door header) and is configured to interact with a door latch disposed in a tubular door handle mounted to the door. This type of strike is sometimes referred to as an overhead mounted strike.

There are currently different types of overhead mounted strikes that are used in these instances. The first type of overhead mounted strike is referred to as a standard overhead surface mounted strike. A standard overhead surface mounted strike is typically mounted to a door header of a door frame using a plurality of fasteners that are secured within corresponding threaded holes formed in the door header. The standard strike is formed as a block of metal that has one or more cavities defined therein for receiving a respective latch, and serves two primary functions: 1) capturing/securing a respective latch within the cavity when the door is moved to a closed position; and 2) providing a stop for the door when moved to a closed position using one or more bumpers. In order to move a door toward an opened position, the tubular door handle is depressed causing the latch to manually retract down and into the tubular door handle and out of the cavity until the latch clears an upper lip of the cavity, thereby allowing the door to be opened.

Problems sometimes arise during installation of the standard strike due to the position of the latch, the position of the header relative to the latch, and/or the vertical thickness of standard strike off the header (e.g., ⅝ to ¾ inches thick) being greater than the vertical travel of the latch (e.g., about ½ inch). For example, if a tubular door handle installer accidentally adjusts the latch disposed within the tubular door handle so that the latch is over-inserted in the strike cavity and fails to check the manual retraction of the latch when the tubular door handle exit device is manually depressed. In this case, the latch will never retract far enough vertically to clear the upper lip of the cavity. This will cause a dangerous situation where the door cannot be manually opened by depressing the tubular door handle, thus by not providing free egress through the door.

A second type of overhead mounted strike that may be used to selectively retain the latch and maintain the door in a closed position is referred to as a prior art electric strike where the strike releases the latch from the secure state when an electrical current is applied to or removed from the device. This type of electric strike may include a pair of keepers rotatably disposed within a strike cavity defined therein that are configured to receive a latch. The keeper is disposed in a latched position to secure the latch within strike cavity and may be rotated to an unlatched position to allow the latch to be removed from the strike cavity without depressing the tubular door handle to open the door. However, in order to allow the keeper to fully rotate to the unlatched position so that the latch may be released from the strike cavity 30, there must be adequate clearance made to the door header to accept the rotating keeper. In order to provide sufficient clearance for the rotating keeper, significant cuts need to be made to the door header which can be difficult and add a significant amount of time to the installation of the prior art electric strike. Furthermore, cutting the door frame weakens the door header, results in an unpleasant appearance for the door frame, and increases the cost of installation of the electric strike.

Thus, what is needed in the art is a surface mounted electric strike which may be used with a single or side-by-side door(s) that provides desired locking and door latch releasing properties and directly mounts to the standard overhead surface mounted strike mounting method thus eliminating extensive cutting or modification of the door header. There is also a need for a cost effective electric strike assembly that can be adapted for use with pairs of tubular door handles of different spacing required for various door constructions. The present invention addresses these needs as well as other needs.

SUMMARY OF THE INVENTION

Briefly described, one aspect of the present invention provides a modular surface mounted electric strike system for use with a door latch assembly to selectively secure a pair of side-by-side first and second doors when in a door closed position in a door frame, wherein the door latch assembly includes a first latch and a second latch associated with the first and second doors respectively. The system comprises a universal base plate having a first side and a second side, wherein each of the first side and the second side include at least one first mounting point and at least one second mounting point. The system also includes a first electric strike module including a first header, a first keeper assembly mounted to the first header, and a first actuator assembly. The first actuator assembly is configured for moving between a first mode for preventing the first keeper assembly from moving toward an unlatched position and a second mode for permitting the first keeper assembly to move toward the unlatched position. The system also includes a second electric strike module including a second header, a second keeper assembly mounted to the second header, and a second actuator assembly. The second actuator assembly is configured for moving between a third mode for preventing the second keeper assembly from moving toward the unlatched position and a fourth mode for permitting the second keeper assembly to move toward the unlatched position. When the first latch and the second latch are separated a first distance in the door closed position: i) the first electric strike module is attached to the at least one first mounting location on the first side of the universal base plate, and ii) the second electric strike module is attached to the at least one first mounting location on the second side of the universal base plate. When the first latch and the second latch are separated a second distance in the door closed position: i) the first electric strike module is attached to the at least one second mounting location on either the first side or the second side of the universal base plate, and ii) the second electric strike module is attached to the at least one second mounting location on the other of the first side or the second side of the universal base plate.

In another aspect, a method of configuring a surface mounted electric strike is provided for use with a door latch assembly to selectively secure a pair of side-by-side first and second doors when in a door closed position in a door frame, wherein the door latch assembly includes a first latch and a second latch associated with the first and second doors respectively. The method comprises: providing a universal base plate having a first side and a second side, wherein each of the first side and the second side include at least one first mounting point and at least one second mounting point; providing a first electric strike module including a first header, a first keeper assembly mounted to the first header, and a first actuator assembly, wherein the first actuator assembly is configured for moving between a first mode for preventing the first keeper assembly from moving toward an unlatched position and a second mode for permitting the first keeper assembly to move toward the unlatched position; and providing a second electric strike module including a second header, a second keeper assembly mounted to the second header, and a second actuator assembly, wherein the second actuator assembly is configured for moving between a third mode for preventing the second keeper assembly from moving toward the unlatched position and a fourth mode for permitting the second keeper assembly to move toward the unlatched position. When the first latch and the second latch are separated a first distance in the door closed position, the method includes: i) attaching the first electric strike module to the at least one first mounting location on the first side of the universal base plate, and ii) attaching the second electric strike module to the at least one first mounting location on the second side of the universal base plate. When the first latch and the second latch are separated a second distance in the door closed position, the method includes: i) attaching the first electric strike module to the at least one second mounting location on either the first side or the second side of the universal base plate, and ii) attaching the second electric strike module to the at least one second mounting location on the other of the first side or the second side of the universal base plate.

In yet another aspect, a modular surface mounted electric strike system for use with a door latch assembly is provided to selectively secure a pair of side-by-side first and second doors when in a door closed position in a door frame. The door latch assembly includes a first latch and a second latch associated with the first and second doors respectively, wherein the first latch and the second latch are spaced apart at a first distance. The system comprises first and second keeper assemblies, a first actuator assembly for association with the first keeper assembly, and a second actuator assembly for association with the second keeper assembly. The system further includes a first base plate having a first side and a second side, wherein each of the first side and the second side of the first base plate include at least one first keeper mounting point configured to attach a respective one of the first keeper assembly and the second keeper assembly. The at least one first keeper mounting point on the first side of the first base plate is spaced apart at a second distance from the at least one keeper mounting point on the second side of the first base plate. The system further includes a second base plate having a first side and a second side, wherein each of the first side and the second side of the second base plate include at least one second keeper mounting point configured to attach a respective one of the first keeper assembly and the second keeper assembly. The at least one second keeper mounting point on the first side of the second base plate is spaced apart at a third distance from the at least one keeper mounting point on the second side of the second base plate. When the first distance matches the second distance: i) the first keeper assembly is attached to the first base plate at the at least one first keeper mounting point on the first side of the first base plate, and the first actuator assembly is associated with the first keeper assembly, and ii) the second keeper assembly is attached to the first base plate at the at least one first keeper mounting point on the second side of the first base plate, and the second actuator assembly is associated with the first keeper assembly. When the first distance matches the third distance: i) the first keeper assembly is attached to the second base plate at the at least one second keeper mounting point on the first side of the second base plate, and the first actuator assembly is associated with the first keeper assembly, and ii) the second keeper assembly is attached to the second base plate at the at least one second keeper mounting point on the second side of the second base plate, and the second actuator assembly is associated with the first keeper assembly.

In another aspect, a method for providing a modular surface mounted electric strike is provided for use with a door latch assembly to selectively secure a pair of side-by-side first and second doors when in a door closed position in a door frame. The door latch assembly includes a first latch and a second latch associated with the first and second doors respectively, wherein the first latch and the second latch are spaced apart at a first distance. The method comprises: providing first and second keeper assemblies; providing a first actuator assembly for association with the first keeper assembly, and a second actuator assembly for association with the second keeper assembly; providing a first base plate having a first side and a second side, wherein each of the first side and the second side of the first base plate include at least one first keeper mounting point configured to attach a respective one of the first keeper assembly and the second keeper assembly, wherein the at least one first keeper mounting point on the first side of the first base plate is spaced apart at a second distance from the at least one keeper mounting point on the second side of the first base plate; and providing a second base plate having a first side and a second side, wherein each of the first side and the second side of the second base plate include at least one second keeper mounting point configured to attach a respective one of the first keeper assembly and the second keeper assembly, wherein the at least one second keeper mounting point on the first side of the second base plate is spaced apart at a third distance from the at least one keeper mounting point on the second side of the second base plate. When the first distance matches the second distance: i) attaching the first keeper assembly to the first base plate at the at least one first keeper mounting point on the first side of the first base plate, and associating the first actuator assembly with the first keeper assembly, and ii) attaching the second keeper assembly to the first base plate at the at least one first keeper mounting point on the second side of the first base plate, and associating the second actuator assembly with the first keeper assembly. When the first distance matches the third distance: i) attaching the first keeper assembly to the second base plate at the at least one second keeper mounting point on the first side of the second base plate, and associating the first actuator assembly with the first keeper assembly, and ii) attaching the second keeper assembly to the second base plate at the at least one second keeper mounting point on the second side of the second base plate, and associating the second actuator assembly with the first keeper assembly.

In yet another aspect, a modular surface mounted electric strike system is provided for use with a door latch assembly to selectively secure a pair of side-by-side movable first and second doors when in a door closed position in a door frame, wherein the door latch assembly includes a first latch associated with the first door and a second latch associated with the second door. The system comprises a universal base plate configured to be mounted to the door frame, wherein the universal base plate includes a first side and a second side, wherein each of the first side and the second side include at least one first mounting point and at least one second mounting point. The system also includes a first electric strike module configured to receive the first latch associated with the first door, wherein the first electric strike module includes a first keeper assembly and a first actuator assembly, wherein the first actuator assembly is configured for moving between a first mode for preventing the first keeper assembly from moving toward an unlatched position and a second mode for permitting the first keeper assembly to move toward the unlatched position. The system also includes a second electric strike module configured to receive the second latch associated with the second door, wherein the second electric strike module includes a second keeper assembly and a second actuator assembly, wherein the second actuator assembly is configured for moving between a third mode for preventing the second keeper assembly from moving toward the unlatched position and a fourth mode for permitting the second keeper assembly to move toward the unlatched position. When the first latch and the second latch are separated a first distance in the door closed position: the first electric strike module is attached to the at least one first mounting point on the first side of the universal base plate, and the second electric strike module is attached to the at least one first mounting point on the second side of the universal base plate. When the first latch and the second latch are separated a second distance in the door closed position: the first electric strike module is attached to the at least one second mounting point on either the first side or the second side of the universal base plate, and the second electric strike module is attached to the at least one second mounting point on the other of the first side or the second side of the universal base plate.

In a further embodiment, a method of configuring a surface mounted electric strike is provided for use with a door latch assembly to selectively secure a pair of side-by-side movable first and second doors when in a door closed position in a door frame, wherein the door latch assembly includes a first latch associated with the first door and a second latch associated with the second door. The method comprises: providing a universal base plate configured to be mounted to the door frame, wherein the universal base plate includes a first side and a second side, wherein each of the first side and the second side include at least one first mounting point and at least one second mounting point; providing a first electric strike module configured to receive the first latch associated with the first door, wherein the first electric strike module includes a first keeper assembly and a first actuator assembly, wherein the first actuator assembly is configured for moving between a first mode for preventing the first keeper assembly from moving toward an unlatched position and a second mode for permitting the first keeper assembly to move toward the unlatched position; and providing a second electric strike module configured to receive the second latch associated with the second door, wherein the second electric strike module includes a second keeper assembly and a second actuator assembly, wherein the second actuator assembly is configured for moving between a third mode for preventing the second keeper assembly from moving toward the unlatched position and a fourth mode for permitting the second keeper assembly to move toward the unlatched position. When the first latch and the second latch are separated a first distance in the door closed position: i) attaching the first electric strike module to the at least one first mounting point on the first side of the universal base plate, and ii) attaching the second electric strike module to the at least one first mounting point on the second side of the universal base plate. When the first latch and the second latch are separated a second distance in the door closed position: i) attaching the first electric strike module to the at least one second mounting point on either the first side or the second side of the universal base plate, and ii) attaching the second electric strike module to the at least one second mounting point on the other of the first side or the second side of the universal base plate.

In another aspect, a modular surface mounted electric strike system is provided for use with a door latch to selectively secure a door when in a door closed position in a door frame, wherein the door is movable relative to the door frame. The system comprises a universal base plate configured to be mounted to the door frame, wherein the universal base plate includes at least one first mounting point and at least one second mounting point. The system also includes an electric strike module configured to receive the door latch, wherein the universal base plate is disposed between the electric strike module and the door frame, wherein the electric strike module includes a keeper assembly and an actuator assembly, wherein the actuator assembly is configured for moving between a first mode for preventing the keeper assembly from moving toward an unlatched position and a second mode for permitting the keeper assembly to move toward the unlatched position. When the door latch is in a first position relative to the door frame in the door closed position, the electric strike module is attached to the at least one first mounting point of the universal base plate. When the door latch is in a second position relative to the door frame in the door closed position, the electric strike module is attached to the at least one second mounting point of the universal base plate.

In yet another aspect, a method of configuring a surface mounted electric strike is provided for use with a door latch to selectively secure a door when in a door closed position in a door frame, wherein the door is movable relative to the door frame. The method comprises providing a universal base plate configured to be mounted to the door frame, wherein the universal base plate includes at least one first mounting point and at least one second mounting point; and providing an electric strike module configured to receive the door latch, wherein the universal base plate is disposed between the electric strike module and the door frame, wherein the electric strike module includes a keeper assembly and an actuator assembly, wherein the actuator assembly is configured for moving between a first mode for preventing the keeper assembly from moving toward an unlatched position and a second mode for permitting the keeper assembly to move toward the unlatched position. When the door latch is in a first position relative to the door frame in the door closed position, attaching the electric strike module to the at least one first mounting point of the universal base plate, and when the door latch is in a second position relative to the door frame in the door closed position, attaching the electric strike module to the at least one second mounting point of the universal base plate.

In a further aspect, a modular surface mounted electric strike system for use with a door latch assembly to selectively secure a door in a closed position within a door frame is provided. The system comprises a base plate and a first electric strike module. The base plate is configured to be mounted to a surface of the door frame, and includes at least one slot extending along a longitudinal axis of the base plate. The first electric strike module includes a first keeper and a housing configured to receive a door latch of the door latch assembly. The first electric strike module includes at least one mating feature configured to correspondingly engage the at least one slot to selectively position the first electric strike module along the longitudinal axis of the base plate. The first electric strike module is configured to be fixedly secured to the base plate, wherein the first keeper is positioned on the base plate to align with the door latch when the door is in the closed position.

In yet another aspect, a method of configuring a surface mounted electric strike for use with a door latch assembly to selectively secure a door in a closed position in a door frame is provided. The method comprises: providing a base plate configured to be mounted to a surface of the door frame, wherein the base plate includes at least one slot extending along a longitudinal axis of the universal base plate; providing a first electric strike module having a first keeper and a housing configured to receive a door latch of the door latch assembly, wherein the first electric strike module includes at least one mating feature configured to correspondingly engage the slot; providing at least one fastener; selectively positioning the first electric strike module along the longitudinal axis of the universal base plate, wherein the at least one mating feature is engaged within the slot; and removably securing the first electric strike module to the base plate using the at least one fastener, wherein the first keeper is positioned to align with the door latch when the door is in the closed position.

In another aspect, a surface mounted electric strike for selectively retaining a door latch of a door is provided. The electric strike comprises a housing, a keeper assembly, and an actuating assembly. The housing is configured to be coupled to a surface of a door frame, and defines a cavity configured for receiving the door latch. The keeper assembly is mounted within the housing and comprises a first keeper arm movable between a latched position and an unlatched position; a first slide pin having a first end and a second end, wherein the first end of the first slide pin is coupled to the first keeper arm; and a slide bar having a first slide block end and a first blocking member, wherein a first channel is defined between the first slide block end and the first blocking member. The actuating assembly is configured for moving between a first mode and a second mode. When the actuating assembly is in the first mode, the second end of the first slide pin is engaged with the slide bar so that the first end of the first slide pin prevents the first keeper arm from moving toward the unlatched position. When the actuating assembly is in the second mode, the second end of the first slide pin is permitted to be received in the first channel to allow the first keeper arm to move toward the unlatched position.

In yet another aspect, a modular surface mounted electric strike system for use with a door latch assembly to selectively secure a door in a closed position within a door frame is provided. The system comprises a base plate configured to be mounted to a surface of the door frame, wherein the base plate includes a plurality of locating features disposed on the base plate. The system further includes a first electric strike module having a first keeper and a housing configured to receive a door latch of the door latch assembly. The first electric strike module includes at least one mating feature configured to correspondingly receive at least one of the plurality of locating features to selectively position the first electric strike module on the base plate. The first electric strike module is configured to be fixedly secured to the base plate, wherein the first keeper is positioned on the base plate to align with the door latch when the door is in the closed position.

DETAILED DESCRIPTION OF THE INVENTION

Figure 1A:
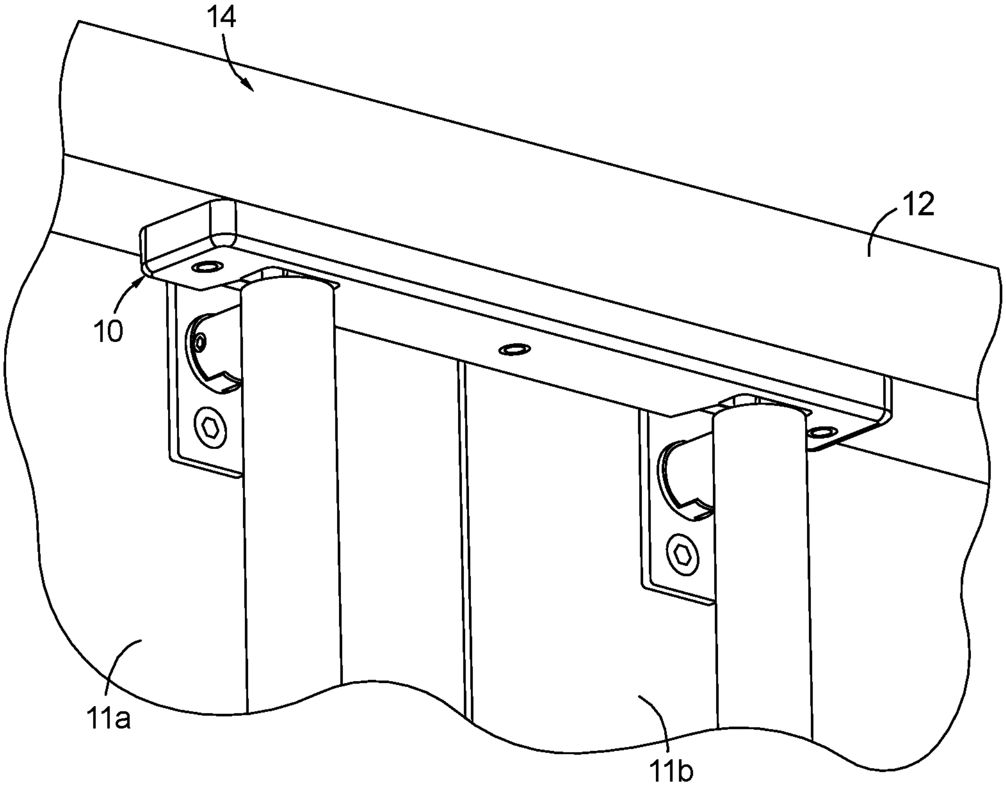
FIG. 1A. PRIOR ART
FIG. 1A is a perspective view of a prior art standard overhead surface mounted strike mounted to a door frame suitable for use with double glass doors along with the tubular door hardware.
Figure 1B:
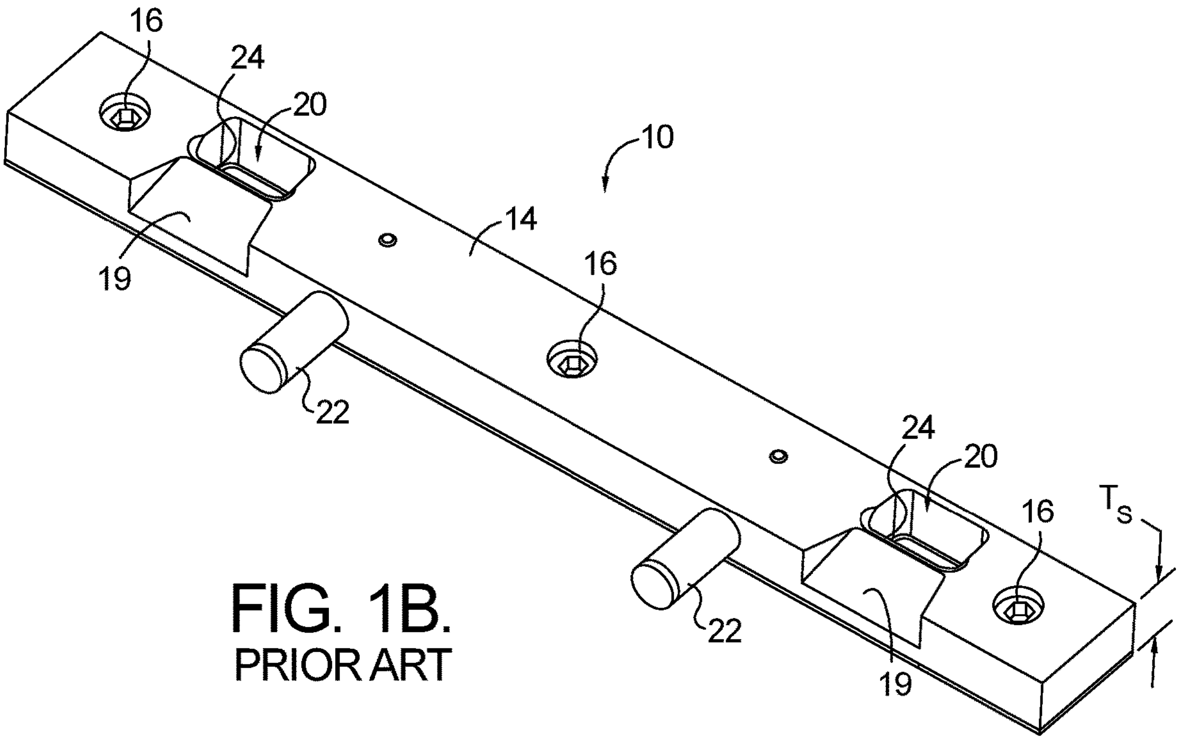
FIG. 1B. PRIOR ART
FIG. 1B is a perspective view of the prior art standard overhead surface mounted strike shown in FIG. 1A.
Figure 2:
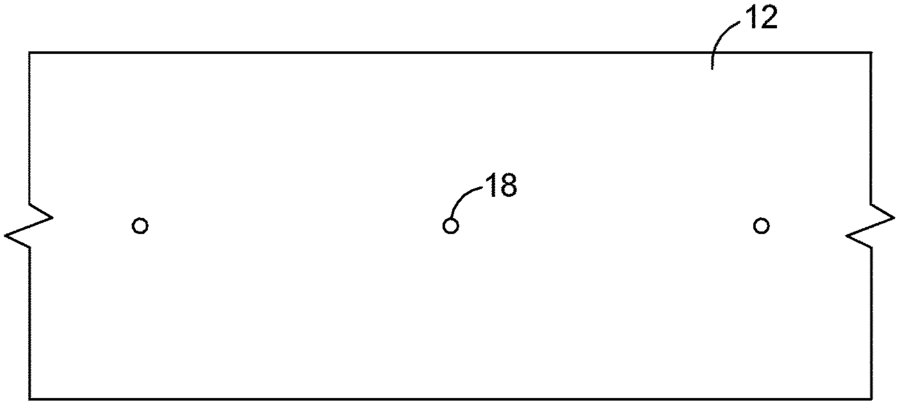
FIG. 2. PRIOR ART
FIG. 2 is a front view of a door header including threaded holes that are used to mount a standard overhead surface mounted strike shown in FIG. 1B.

Referring to the drawings in detail, and initially to FIGS. 1A, 1B and 2, a prior art standard overhead surface mounted strike 10 for use with one or more swinging doors 11*a*, 11*b* is shown. Standard strike 10 is typically mounted to a door header 12 of a door frame 14 using a plurality of fasteners 16 that are secured within corresponding threaded holes 18 formed in door header 12. Standard strike 10 is a block of metal having one or more sets of ramp surfaces 19 and cavities 20 defined therein. Ramp surface 19 is configured to move a respective latchbolt toward a retracted position as the associated door 11*a*, 11*b* is moved toward the closed position shown in FIG. 1A. As the door approaches its closed position, the top edge of the latchbolt rides over an upper lip 24 and then extends so that the latchbolt is disposed in its respective cavity 20 to selectively retain the door in the closed position. Standard strike 10 serves three primary functions: 1) providing a ramped surface to receive the latchbolt into the cavity when the door is moved to a closed position 2) securing a respective latch within cavity 20; and 3) providing a stop for the door when moved to a closed position using one or more bumpers 22. In order to move a door toward an opened position, the latch is manually retracted down the tubular handle and out of cavity 20 until the latch clears upper lip 24 of cavity 20, thereby allowing the door to be opened.

Problems sometimes arise during installation of standard strike 10 because the thickness $T_s$ of strike 10 (e.g., ⅝ to ¾ inches thick) is greater than the vertical travel of the latch (e.g., about ½ inch). For example, if tubular door handle installer accidentally adjusts the latch disposed within the tubular door handle so that the latch is over-inserted in the strike cavity and fails to check the manual retraction of the latch when the tubular door handle exit device is manually depressed before leaving the installation site, the latch will never retract far enough vertically to clear upper lip 24 of cavity 20. This will cause a dangerous situation where the door cannot be manually opened by depressing the tubular door handle, thus by not providing free egress through the door.

Figure 3:
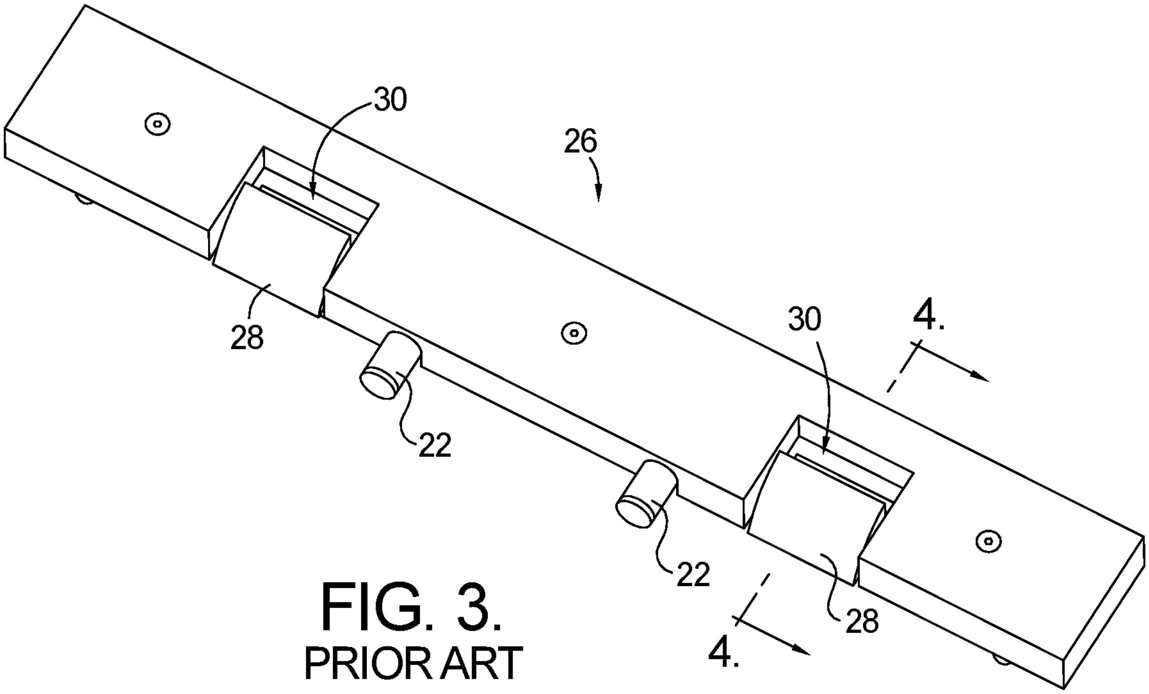
FIG. 3. PRIOR ART
FIG. 3 is a perspective view of a prior art overhead electric strike suitable for used with double glass doors.
Figure 4:
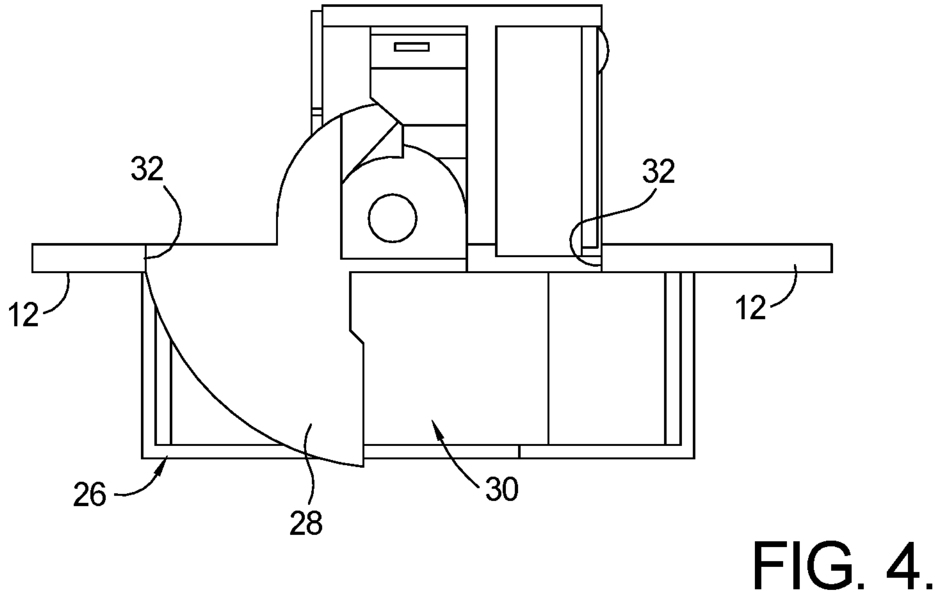
FIG. 4. PRIOR ART
FIG. 4 is a cross-sectional view of a cavity taken along line 4-4 in FIG. 3 showing a keeper of the electric strike in a latched position.
Figure 5:
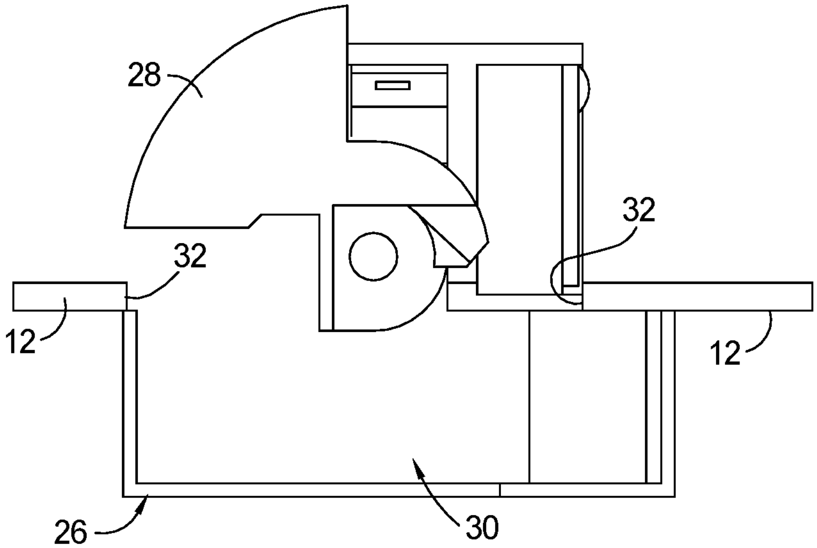
FIG. 5. PRIOR ART
FIG. 5 is a cross-sectional view similar to FIG. 4 showing the keeper of the electric strike in an unlatched position.
Figure 6:
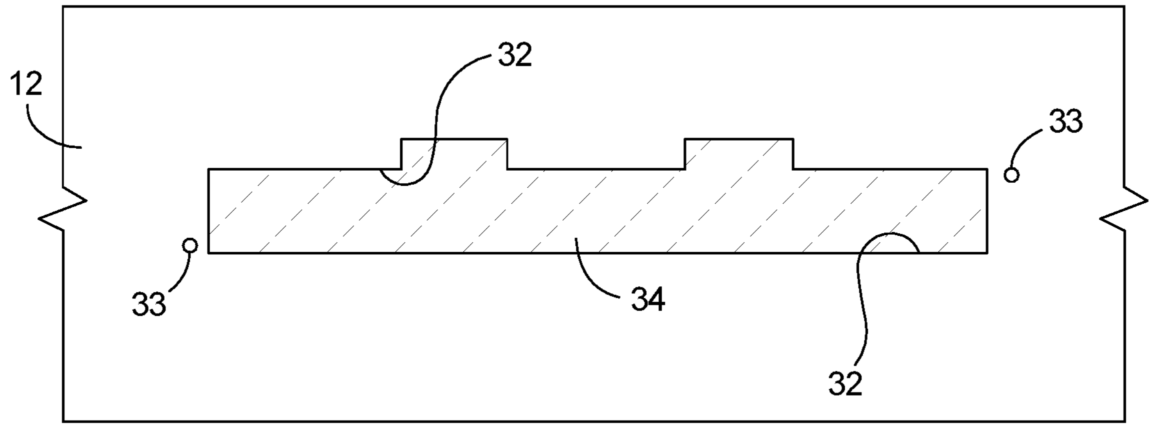
FIG. 6. PRIOR ART
FIG. 6 is a front view of modifications (cut-out depicted with dashed lines and new threaded hole locations) made to the door header to accept the electric strike shown in FIG. 3.

As an alternative to using standard strike 10 in the arrangement described above, a prior art electric strike 26 may be used to selectively retain the latch and maintain the door in a closed position. As seen in FIGS. 3, 4 and 5, electric strike 26 may include a pair of keepers 28 rotatably disposed within a strike cavity 30 defined therein configured to receive a latch. As best seen in FIGS. 3 and 4, keeper 28 is disposed in a latched position to secure the latch within its respective strike cavity 30. As best seen in FIG. 5, keeper 28 may rotated to an unlatched position thereby allowing the latch to be removed from the strike cavity 30 when the door is opened without retracting the latch. However, in order to allow keeper 28 to fully rotate to the unlatched position so that the latch may be released from strike cavity 30, it can be seen that there must be adequate clearance made to the door header 12 to accept the rotating keeper 28. In order to provide sufficient clearance for keeper 28 to move from the latched position to the unlatched position, significant cuts 32 and new mounting holes 33 need to be made to header 12 of door frame 14 during the installation of the electric strike 26. The extensive cuts 32 and new mounting holes 33 need to be made in door header 12 of frame 14 are illustrated in FIG. 6, which are difficult to make and add a significant amount of time to the installation of strike 26. Further, cutting of door frame 14 and removal of material 34 weakens door header 12, and may lead to an unpleasant appearance, and significantly increases the cost of installation of the strike 26.

Figure 7:
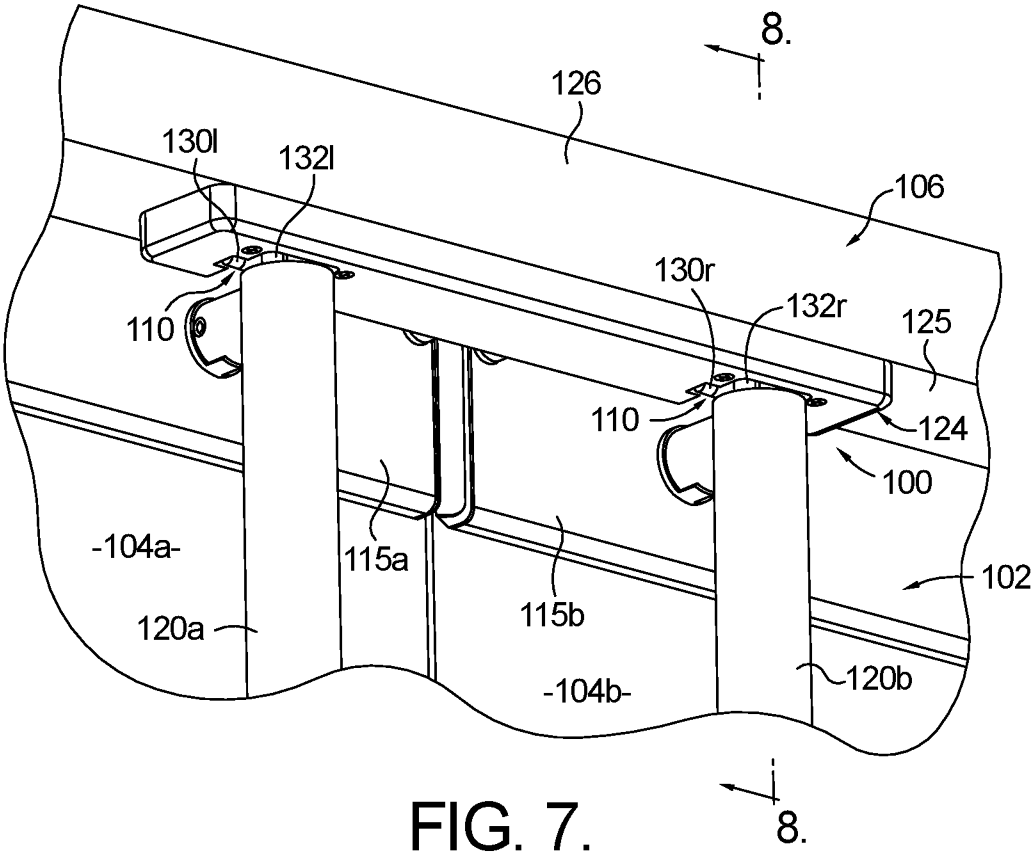
FIG. 7 is an enlarged perspective view of a door lock assembly including a tubular door latch assembly and an exemplary overhead surface mounted electric strike for use with framed double glass doors in accordance with an aspect of the present invention.
Figure 8:
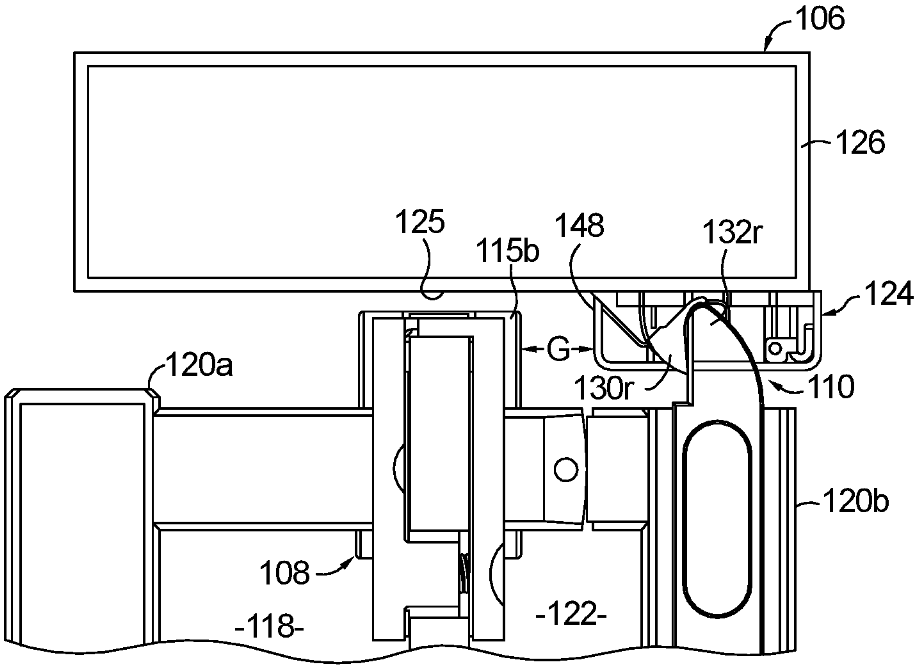
FIG. 8 is a cross sectional view taken along line 8-8 in FIG. 7.

To address the above-referenced drawbacks and deficiencies, and with reference to FIGS. 7 and 8, an improved door lock assembly 100 configured for use with an exemplary double panel glass door installation 102 is provided. As shown in FIG. 7, exemplary framed dual panel glass door installation 102 may include a pair of doors 104*a*, 104*b* pivotally mounted within a door frame 106 using respective hinges (not shown). Each door 104*a*, 104*b* may also include a pair of vertically oriented tube handles 120*a*, 120*b* disposed on opposing sides of the respective door which are fixedly mounted to one another using a door handle mounting assembly 108. Doors 104*a*, 104*b* are mounted so as to swing outwardly toward an unsecure side 118 such as by pulling handle 120*a* on unsecure side 118, or by pushing tubular door handle 120*b* on a secure side 122, when the door lock assembly 100 is in an unlocked state, as will be described in greater detail below.

Door lock assembly 100 includes a door latch assembly 110 and a surface mounted electric strike 124 that is configured to be mounted to a surface 125 of a transverse upper frame member 126 (i.e., header) of door frame 106. In the instance where the header is not wide enough to allow electric strike 124 to be mounted thereto, a header extension (not shown) may be secured to header 126 to provide an additional mounting surface for electric strike 124. Electric strike 124 may be configured as a single latch strike if only one door is provided, or as a double latch strike if a double door is provided as seen in FIG. 7. Electric strike 124 may be laterally positioned on surface 125 of header 126 (and header extension when provided) such that a respective keeper 130*l*, 130*r* disposed in electric strike 124 aligns with and engages a respective latch 132*l*, 132*r* movably disposed, for example, within handle 120*b* on door 104*a*, 104*b*. With regard to FIG. 8, it should be noted that the keeper/latch combination shown and described is directed to keeper 130*r* and latch 132*r* for sake of simplicity and clarity, with the understanding that keeper 130*l* and latch 132*l* operate in a similar fashion. Furthermore, for any reference numbers that do not include the (r) and (l) designators, it should be understood that the associated discussion applies to either or both of the (r) or (l) versions of the respective component.

Each latch 132 is a component of door latch assembly 110 that is used in conjunction with electric strike 124 to secure the respective door 104 to door frame 106. In particular, latch 132 is movably mounted within an upper end of tubular door handle 120 between an extended position (FIG. 18A) and a retracted position (FIG. 18F). In the extended position, latch 132 extends outwardly from a top edge of handle 120 to selectively be positioned within and engaged with electric strike 124. Door latch assembly 110 further includes a biasing mechanism, such as, a spring (not shown), that operates to bias latch 132 toward the extended position. As best seen in FIGS. 8 and 18A-18F, latch 132 has a unique profile, however it should be understood that this solution applies to latches of other profiles such as, for example, a roller style.

Figure 9:
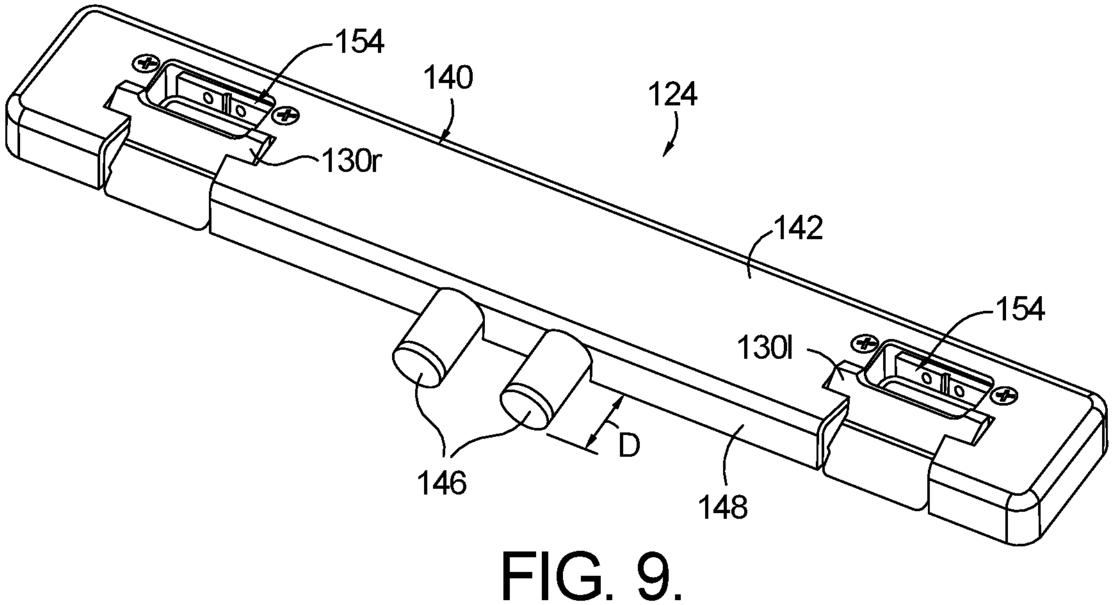
FIG. 9 is a top perspective view of the exemplary electric strike shown in FIG. 8.
Figure 10:
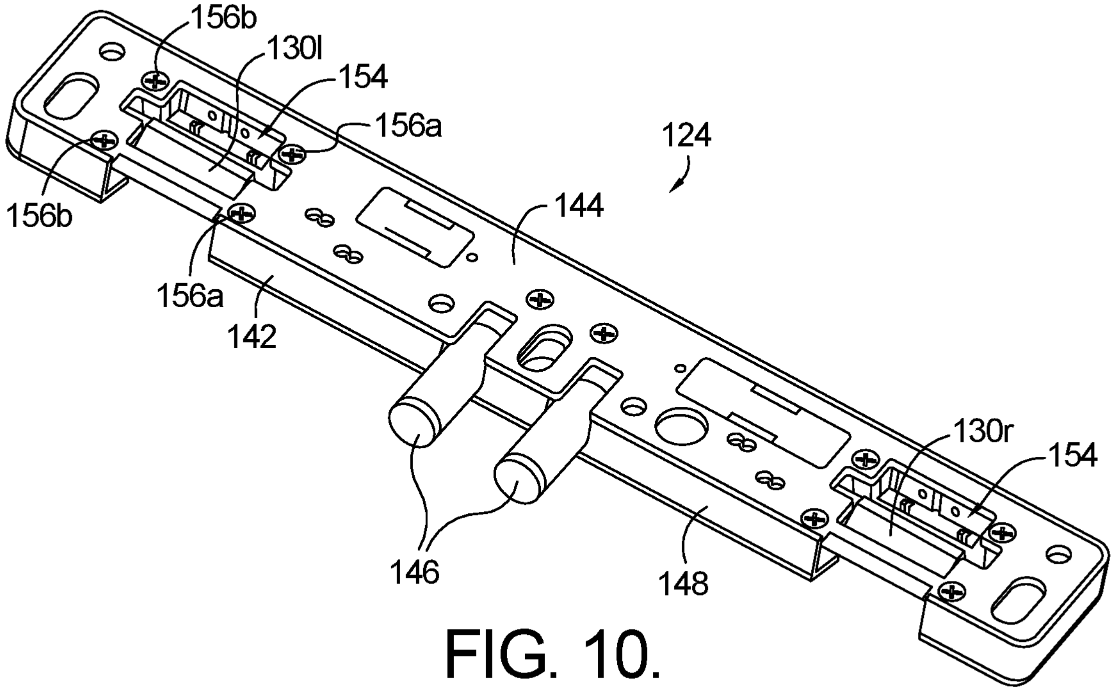
FIG. 10 is a bottom perspective view of the exemplary electric strike shown in FIG. 9.
Figure 11:
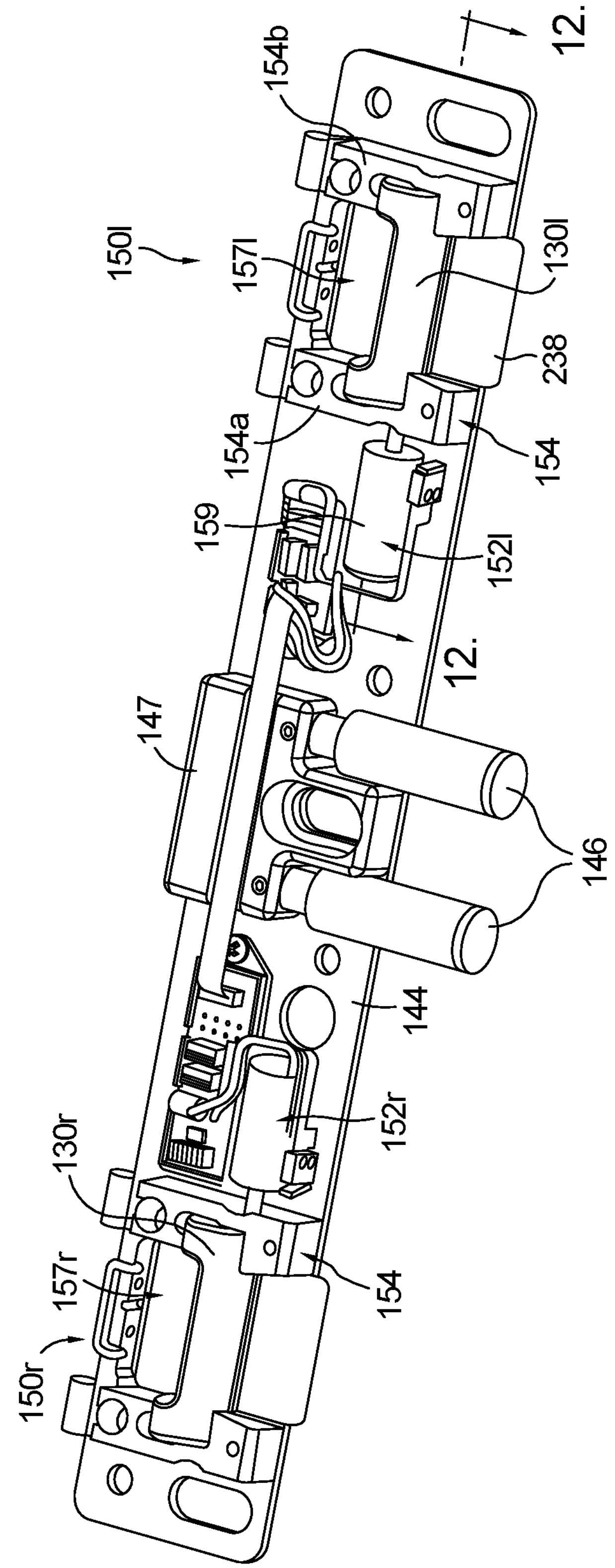
FIG. 11 is a top perspective view of the exemplary electric strike shown in FIG. 9 with the strike cover removed.

Turning now to FIGS. 9 through 11, exemplary electric strike 124 is configured for an overhead surface mount installation is shown. Electric strike 124 generally includes an assembly 140 comprising a cover 142 and a base plate 144. Door bumpers 146 may be mounted to a mounting location 147 on base plate 144 and extend outwardly from sidewall 148 a distance D. Door bumpers 146 may be laterally adjustable so as to change distance D such that distance D is substantially equal to the gap G (FIG. 8) between sidewall 148 of electric strike 124 and door 104, or a respective door frame rail 115*a*, 115*b* if used in association with door 104*a*, 104*b* (as shown in FIGS. 7 and 8). Door bumpers 146 may thus properly align latch 132 with keeper 130 while door 104 is in a closed position, while also providing lateral support to door 104 should undue force be applied to door 104 from unsecure side 118 (FIG. 8). It should be understood that the present invention may be used in association with a framed glass door arrangement including stiles and/or rails as seen in FIGS. 7-8 and FIGS. 20A-20G, or a frameless glass door arrangement.

As best seen in FIG. 11, electric strike 124 further includes a pair of identical keeper assemblies 150*l*, 150*r* that operate in conjunction with respective actuator assemblies 1521, 152*r* to selectively retain latches 1321, 132*r* within electric strike 124 to secure the door 104*a*, 104*b* in a closed position relative to door frame 106. Keeper assemblies 150*l* and 150*r* are identical except for the relative position of actuator assemblies 1521, 152*r* with respect to its respective keeper 1301, 130*r*. The keeper assemblies are symmetrical in design so that they may accommodate the actuator assemblies on either side depending their location on the plate 144. The operation of each keeper assembly 150*l*, 150*r* is identical, as will be described in greater detail below.

Figure 12:
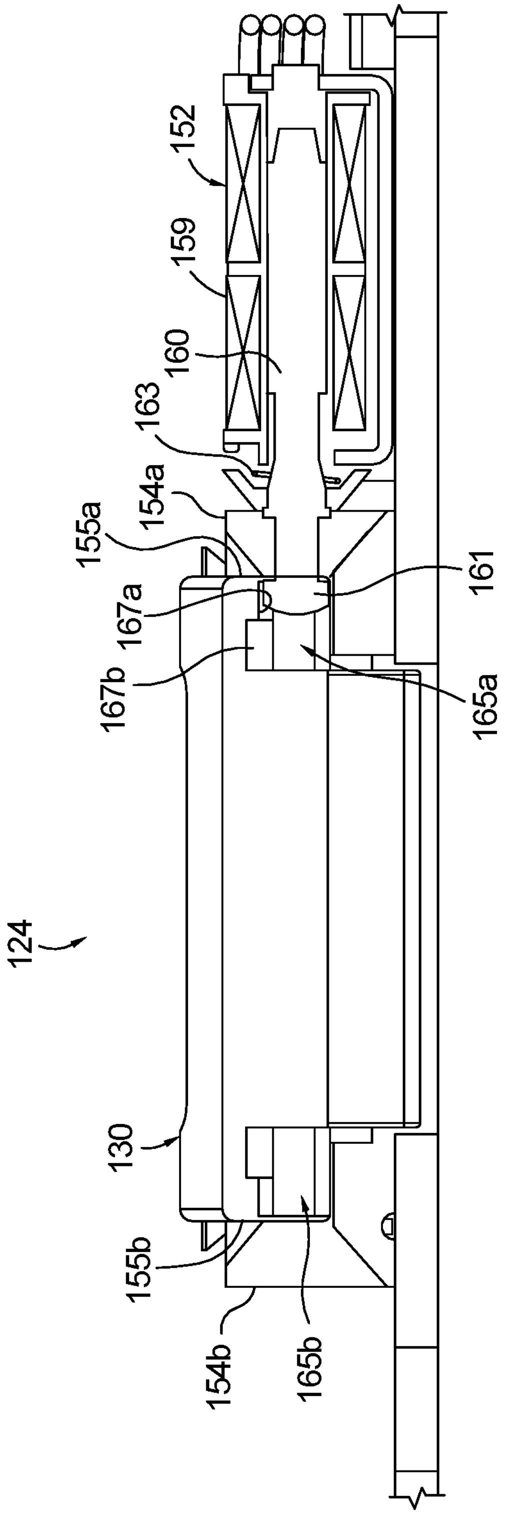
FIG. 12 is a cross sectional view taken along line 12-12 in FIG. 11 showing a plunger of the actuating assembly in a blocking position.
Figure 13:
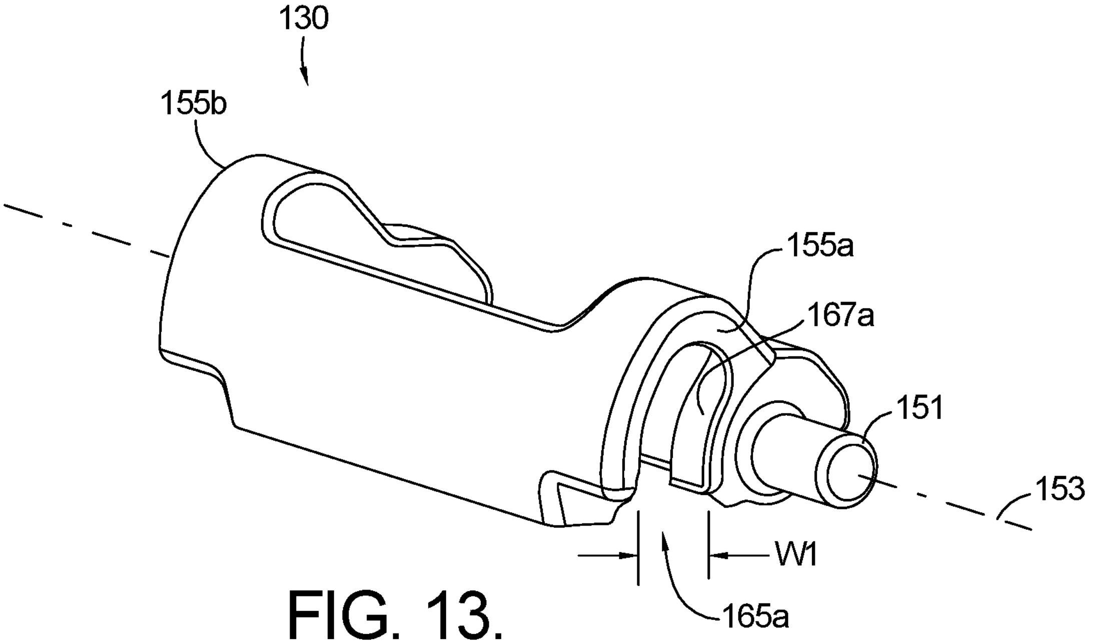
FIG. 13 is a front perspective view of a keeper in accordance with one aspect of the present invention.
Figure 14:
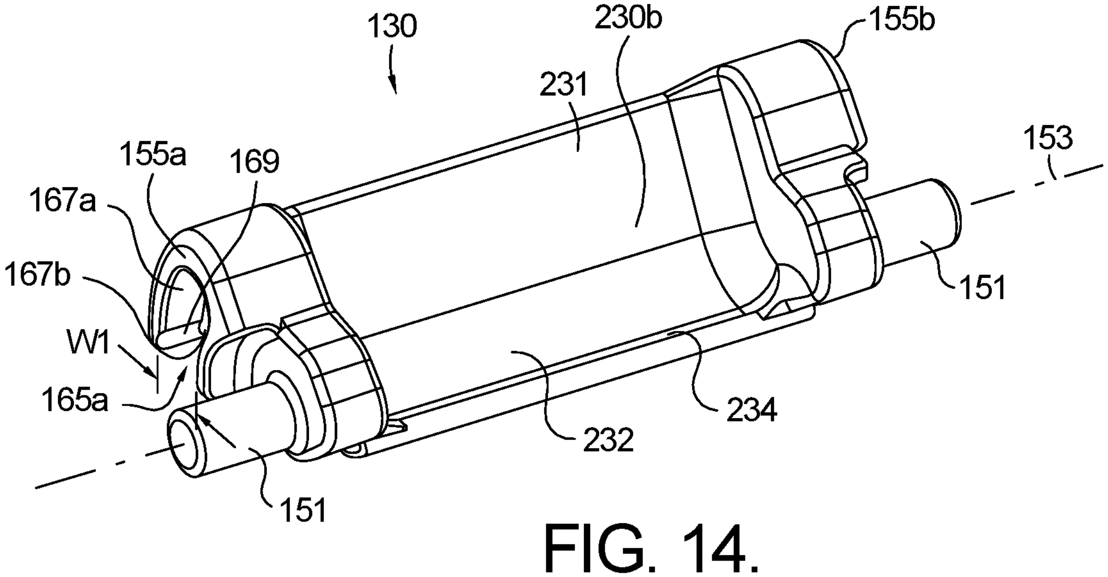
FIG. 14 is a back perspective view of the keeper shown in FIG. 13.

With specific reference to FIGS. 11-13, keeper assembly 150 generally includes keeper 130 that is rotatably mounted to a header 154. In particular, keeper 130 is rotatably disposed between opposing sides 154*a*, 154*b* of header 154 using pins 151 and configured for pivoting about an axis of rotation 153 between a latched position (e.g., FIGS. 18A-18E) and an unlatched position (e.g., FIG. 18F). In one aspect, header 154 is separable from base plate 144 and selectively positioned and secured to base plate 144 such as via fasteners 156*a*, 156*b* (FIG. 10). Alternatively, header 154 may be integrally formed with base plate 144 as a unitary body. In either case, keeper 130, header 154, and base plate 144 define a respective cavity 157*l*, 157*r* that is configured for receiving respective latch 132.

With reference to FIGS. 12-15, keeper 130 includes two opposing ends 155*a*, 155*b*, wherein at least one of the ends 155*a*, 155*b* has a slot 165 defined therein, such as an arc-shaped groove. For example, as seen in FIG. 12, a slot 165*a*, 165*b* may be provided on opposing ends 155*a*, 155*b* of keeper 130 to accommodate actuator assembly 152 being selectively positioned on either side of keeper 130 in a modular version of electric strike 124. Each slot 165 may be provided in a stepped configuration that includes a first outer slot 167*a* having a first width W1 (FIGS. 13-14), and a second inner slot 167*b* having a second width W2 (FIG. 16) that is greater than first width W1. Inner and outer slots 167*a*, 167*b* may be coextensive with one another (i.e., side-by-side), and are configured to interact with actuator assembly 152 to selectively restrain or release keeper 130 as will be described in more detail below.

In one exemplary embodiment, as seen in FIGS. 11 and 12, actuator assembly 152 may comprise a solenoid 159 and a plunger 160 movably disposed within solenoid 159. Solenoid 159 may be mounted directly to housing 140 (e.g., base plate 144) and is configured to move plunger 160 between a first blocking position (i.e., first mode) and a second unblocking position (i.e., second mode). In the first blocking position, in accordance with one aspect of the present invention, a plunger head 161 is adjacent to and/or in direct engagement with an engagement surface of keeper 130 to maintain keeper 130 in the latched position and thereby retain latch 132 in strike cavity 157. For example, as seen in FIG. 12, plunger head 161 may be adjacent to and/or in direct engagement with a shroud engagement surface 169 defined in first outer slot 167*a* of keeper 130 to maintain keeper 130 in the latched position. Therefore, if latch 132 engages keeper 130 with a vertical force 171 when plunger

160 is in the first blocking position, a reaction force to resist rotation of keeper 130 is transferred directly to housing 140 through a contact surface 173 of header 154 in accordance with an aspect of the present invention. In the second unblocking position, plunger head 161 is moved out of alignment with and/or disengaged from shroud 169 of first outer slot 167*a* of keeper 130 so that keeper 130 is permitted to move to the unlatched position thereby allowing latch 132 to be removed from cavity 161 and door 104 to be opened relative to door frame 106. This can be accomplished by either moving plunger 160 inward toward solenoid 159 or further away from solenoid to the position shown in FIG. 15. When plunger head 161 is in the position shown in FIGS. 15-16, plunger head 161 is misaligned with shroud 169 of first outer slot 167*a* and disposed within second inner slot 167*b* to allow keeper 130 to rotate to the unlatched position when door 104 is opened. Keeper 130 is able to rotate to the second unblocking position because the second width W2 of second inner slot 167*b* is greater than a width W3 of plunger head 161 so that plunger head 161 can freely travel within second inner slot 167*b* as keeper 130 is rotating to the unlatched position.

By allowing for the direct engagement of actuator assembly with keeper 130, the mechanical aspects of electric strike 124 are simplified and therefore allows the width of electric strike 124 to be small enough to allow electric strike to be mounted to surface 125 of header 126 of door frame 106 without interference from housing 140, and eliminates the need to cut door frame 106 to properly position electric strike 124 relative to the door latch assembly 110.

It should be understood that solenoid 159 may operate in a "fail-secure" mode, meaning the keeper assembly is in the locked state when electrical power is not present. When solenoid 159 is in an unpowered state in the position shown in FIG. 12, plunger 160 is positioned in the first blocking position so that plunger head 161 is positioned in engagement, or aligned with) with shroud 169 of first outer slot 167*a* to maintain keeper 130 in the latched position and prevent keeper 130 from rotating to the unlatched position. When solenoid 159 is energized to a powered state, solenoid 159 moves plunger 160 to the second unblocking position by either extending or retracting plunger 160 so that plunger head 161 is no longer aligned with first outer slot 167*a* to allow keeper 130 to rotate to the unlatched position. When solenoid 159 is thereafter transitioned from the powered state to the unpowered state, a biasing mechanism 163 (e.g., plunger spring) disposed between solenoid 159 and plunger head 161 operates to move plunger 160 back to the first blocking position shown in FIG. 12.

Figure 15:
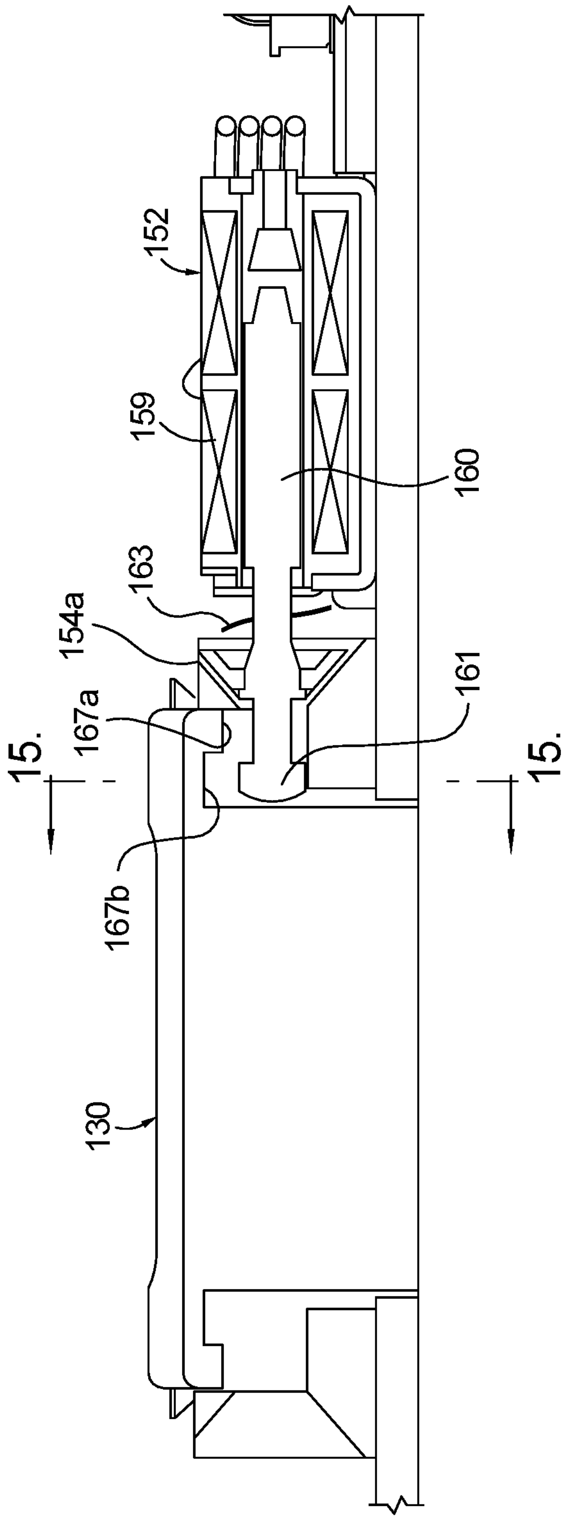
FIG. 15 is a cross-sectional view similar to FIG. 12 except that the plunger of the actuating assembly is in an unblocking position.
Figure 16:
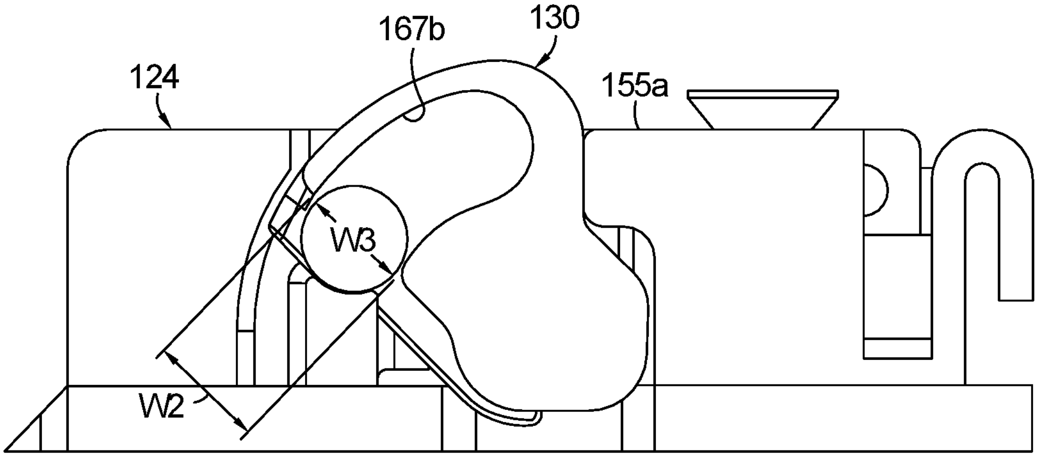
FIG. 16 is a cross sectional view taken along line 16-16 in FIG. 15.
Figure 17:
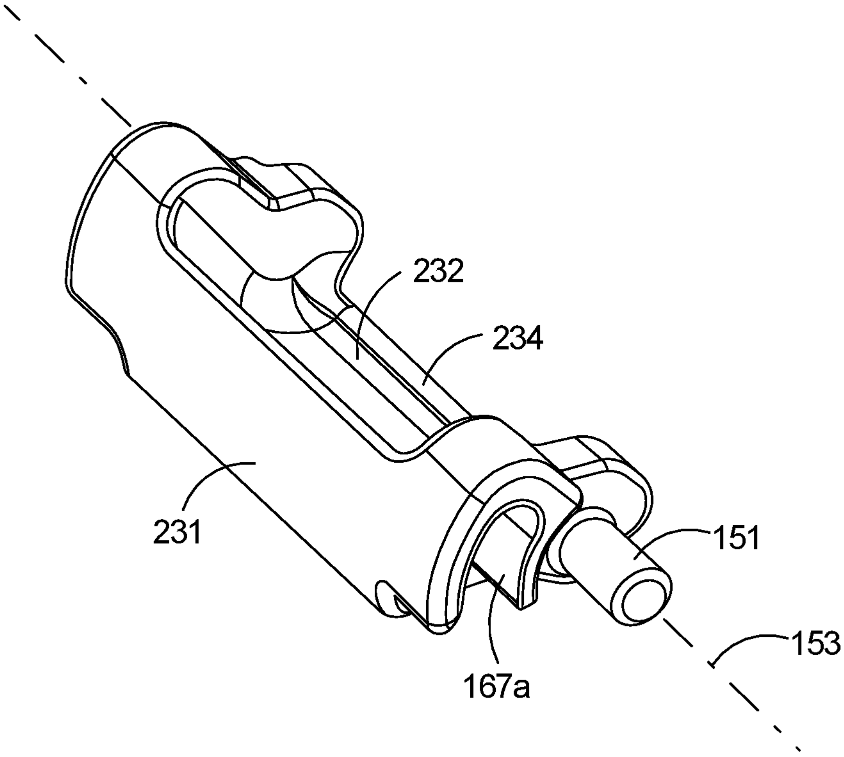
FIG. 17 is a front perspective view similar to FIG. 13 showing the keeper at a different angle.

It should also be understood that solenoid 159 may operate in a "fail-safe" mode, meaning the keeper assembly is in the locked state only when electrical power is present. When solenoid 159 is in an unpowered state as shown in FIG. 15, plunger 160 is positioned in the second unblocking position so that plunger head 161 is misaligned with shroud 169 of first outer slot 167*a* and disposed within second inner slot 167*b* to allow keeper 130 to rotate to the unlatched position when door 104 is opened. Keeper 130 is able to rotate to the second unblocking position because the second width W2 of second inner slot 167*b* is greater than a width of plunger head 161 so that plunger head 161 can freely travel within second inner slot 167*b* as keeper 130 is rotating t the unlatched position. When solenoid 159 is energized to a powered state, solenoid 159 moves plunger 160 to the first blocking position shown in FIG. 12 by retracting plunger 160 so that plunger head 161 is aligned with first outer slot 167*a* of keeper 130 to prevent keeper 130 from rotating to the unlatched position. When solenoid 159 is thereafter transitioned to the unpowered state, biasing mechanism 163 (e.g., plunger spring) may operate to move plunger 160 back to the second unblocking position.

In accordance with further aspects of the present invention, keeper 130 of electric strike 124 includes additional features that address some of the drawbacks and deficiencies that exist in current overhead mounted strikes. In general, as seen in FIGS. 14, 17 and 18A-18F, keeper 130 includes a keeper body portion 231 and an extended lobe portion 232 having a terminal end 234. As will be described further below, terminal end 234 of keeper 130 provides an upper travel limit for latch 132 when positioned in strike cavity 157 to prevent a situation where an installer does not properly set the upper travel limit for the latch whereby binding of the latch may occur if the latch is installed too deep in the strike cavity. In addition, the profile of a keeper face 230*b* in combination with the relative position of rotational axis 153 of keeper 130 allow keeper 130 to be rotated an angle B (e.g., about 45 degrees) to the unlatched position so that keeper face 230*b* operates to ramp the latch 132 out of strike cavity 157. The limited rotational angle B required to move keeper 130 to the unlatch position allows electric strike 124 to be very compact in size and eliminates the need for any cuts to be made in door frame 106 to install electric strike 124. While the rotation of keeper 130 is described above as being about 45 degrees, it should be understood that such rotation can be between about 45 degrees and about 60 degrees to accommodate for both ⅝" and ¾" form factors while still allowing electric strike 124 to be surface mounted. These aforementioned aspects will be illustrated through the following discussion of the operation of electric strike 124.

Figure 18A:
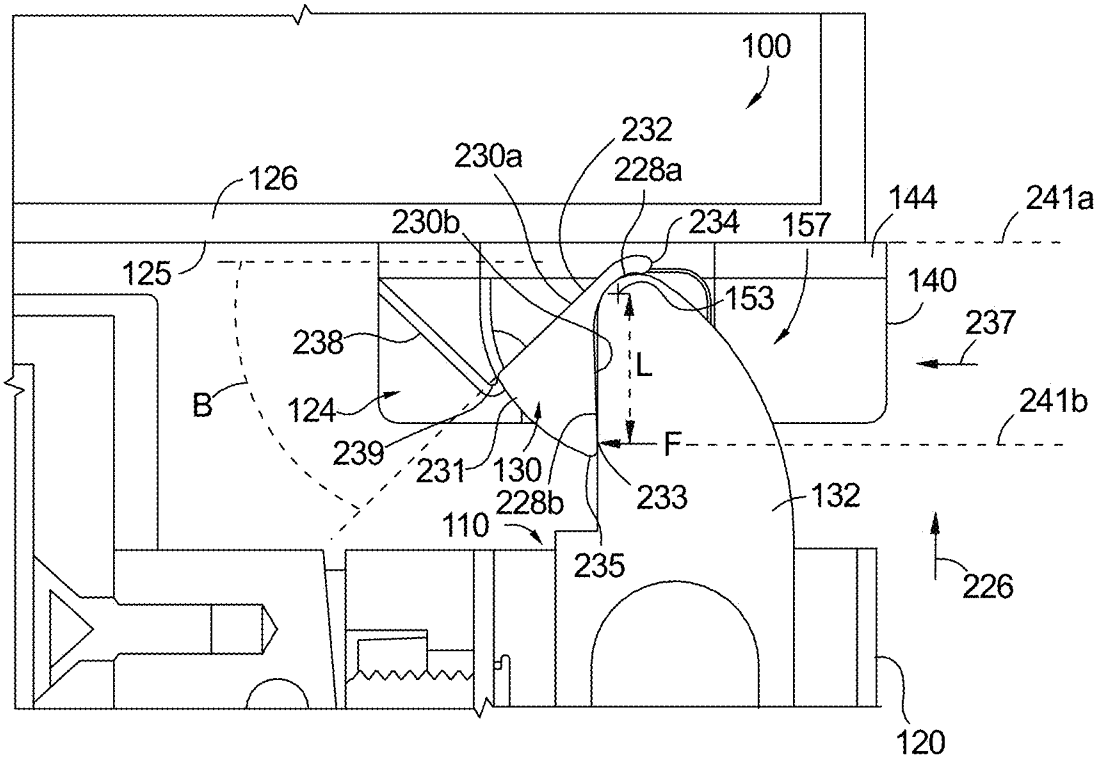
FIGS. 18A-18F is a series of schematic cross sectional views showing the electric strike in FIGS. 8-11 moving from a latched position toward an unlatched position as the door is opening in accordance with an aspect of the present invention.

As best seen in FIG. 18A, keeper 130 is disposed in a latched position so as to selectively retain latch 132 within cavity 157. Keeper 130 includes keeper stop face 230*a* and a keeper face 230*b*. In the latched position, at least a portion of keeper face 230*b* is configured to engage latch face 228*b* of latch 132 at a contact interface 233 to prevent the door from moving to the opened position. When in the position shown in FIG. 18A, latch 132 is biased upwardly in a latch extending direction 226 through a biasing mechanism disposed in the handle 120. In order to set the upper travel limit of latch 132 within cavity 157, extended lobe 232 may be constructed to define an arcuate cross-section that extends to terminal end 234, whereby keeper face 230*b* may be a continuous surface that extends from keeper body portion 231 and along extended lobe 232 to terminal end 234. Extended lobe 232 is proportioned so that terminal end 234 is positioned within cavity 157 and acts as a positive stop to engage an upper portion 228*a* of latch 132. Engagement of upper portion 228*a* of latch 132 with terminal end 234 limits the upward lateral translation of latch 132 within cavity 157. It should be understood that upper portion 228*a* of latch 132 can be the apex of latch 132 or any portion of latch 132 that, when in contact with terminal end 234, operates to stop upward travel of latch 132. Further, extended lobe 232 may include and be described in a manner other than having an arcuate cross-section, such as being hook-shaped or as to generally follow the shape of the outer surface of an upper portion of latch 132, and still fall within the scope of the present invention. While extended lobe 232 may provide an upper travel limit for latch 132 during installation, it should be understood that contact between extended lobe 232 and upper end 228*a* is not required for operation of electric strike 124.

As best seen in FIG. 18A, when plunger 160 of actuator assembly 152 is moved to an unblocking position (e.g., FIG. 15), the movement of the door in an opening direction 237 will cause latch 132 to contact keeper 130 at a contact interface 233 with a force F that is directed in the same direction as opening direction 237. The force F imposed by latch 132 on keeper face 230*b* operates to rotate keeper 130 about its axis of rotation 153 (e.g., pins 151-FIGS. 13, 14) to an unlatched position until keeper stop face 230*a* engages surface 125 or base plate 144 of housing 140, as best seen in the sequence of FIGS. 18B-18F. In particular, as seen in FIG. 18A. a distance L between contact interface 233 of the force F (established by the contour of keeper latch face 230*b*) and the position of axis of rotation 153 is sufficient to provide a moment that allows keeper 130 to easily rotate from the latched position to the unlatched position, while at the same time allowing for a compact rotation of keeper 130 to allow for the release of latch 132 from strike cavity 157. This is at least in part achieved by positioning axis of rotation 153 of keeper 130 above the contact interface 233 223 of force F throughout the rotation of keeper 130 from the latched position to the unlatched position as best seen in FIGS. 18A-18F. Stated in another way, the axis of rotation 153 of keeper 130 is disposed between a first plane 241*a* defined by base plate 144 (or surface of door header 126) and a second plane 241*b* that is coextensive with the force F imposed on keeper 130 during the rotation of keeper 130 from the latched position to the unlatched position.

In another aspect, from the position shown in FIG. 18A, extended lobe 232 may operate to impart a downward force against latch 132 when keeper 130 first starts to rotate clockwise towards the unblocking position to assist with the initial retraction of latch 132 within door handle 120. After keeper stop face 230*a* engages surface 125 (or base plate 144), as seen in the progression of FIGS. 18E-18F, latch 132 continues to slide along keeper latch face 230*b* until latch 132 retracts sufficiently downward to clear a bottom edge 235 of keeper 130 and an edge 239 of a fixed outer ramp 238 whereby latch 132 is released from cavity 157 and the door can be opened.

As described above, proper positioning of the door latch 132 within strike 124 is important to ensuring the proper functioning of door latch assembly 110. In one example, positioning latch 132 so that it extends all the way through cavity 157 will create a situation where latch 132 engages header 126 rather than keeper 130. In another example, latch 132 may be positioned within cavity 157 but still be positioned too deep where the opening force of latch 132 aligns with rotational axis 153 of keeper 130 so as to fail to provide an adequate moment to rotate keeper 130 when the door is moved towards the opened position. In either case, door latch 132 will fail to engage with and/or rotate keeper 130 and the door 104 will remain jammed in the closed position. As seen in FIG. 18A, by being integrally formed on keeper 130, extended lobe 232 and terminal end 234 provide a positive stop against which door latch 132 may engage during installation and/or maintenance of door latch assembly 110. As a result, over-insertion of door latch 132 is prevented and under-insertion may be indicated by lack of engagement of door latch 132 and extended lobe 232.

Figure 18B:
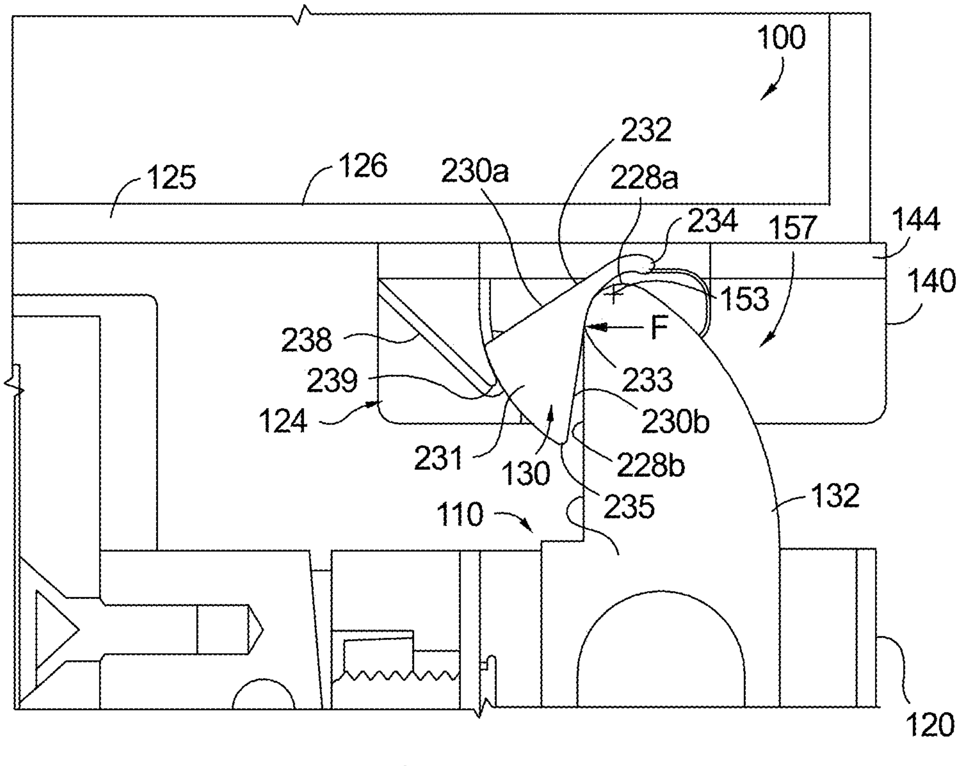
Figure 18C:
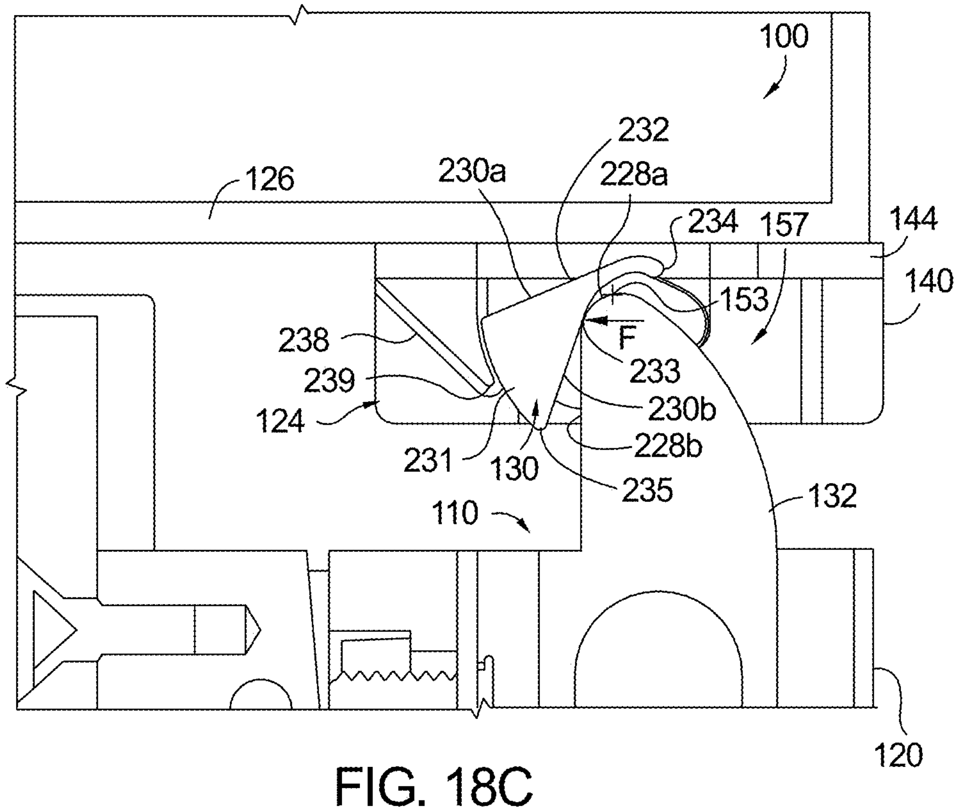
Figure 18D:
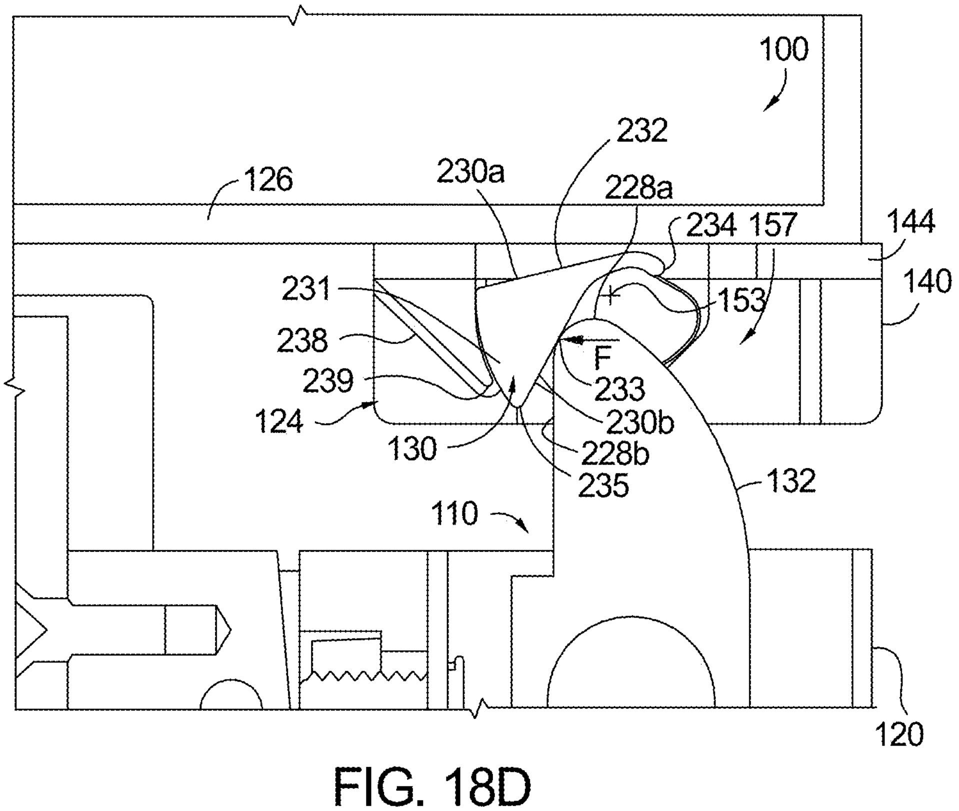
Figure 18E:
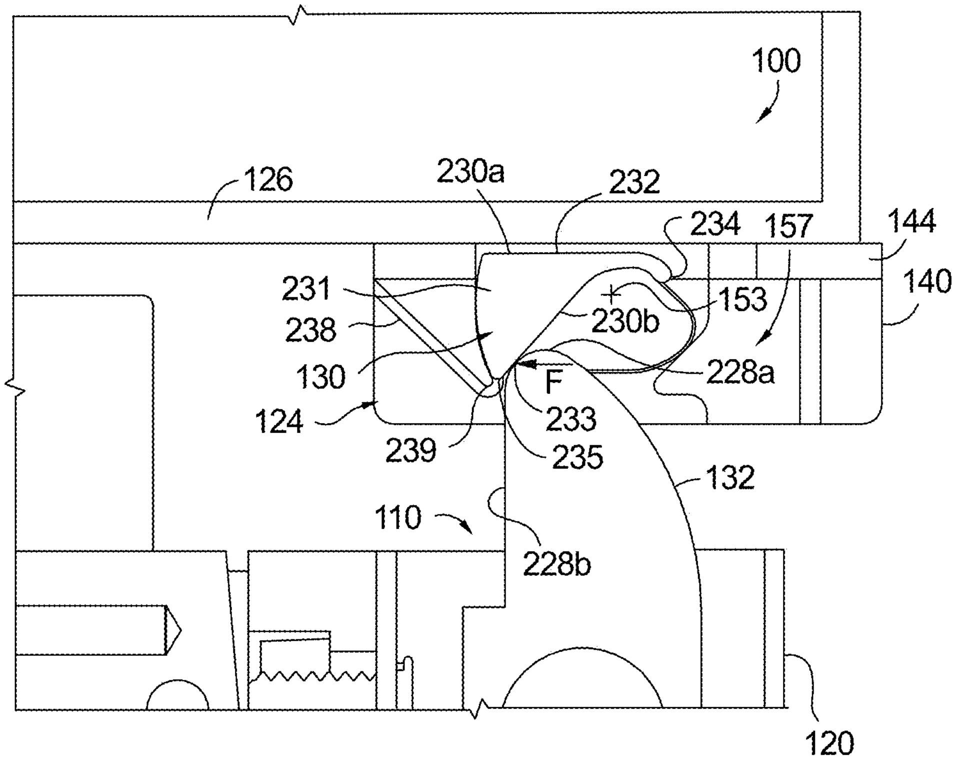
Figure 18F:
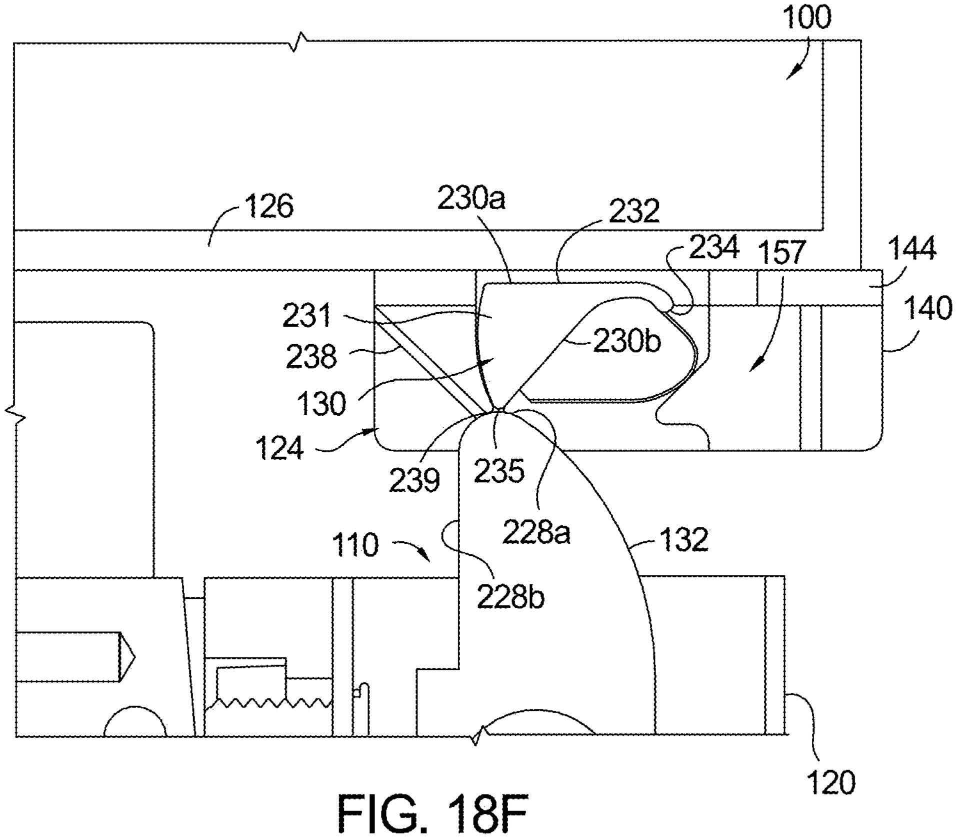

In a further example, positioning latch 132 too far within cavity 157 may exceed the magnitude of translational retraction distance of latch 132, such as within door handle 120 as shown in FIG. 18B. For instance, the maximum translational retraction distance of door latch 132 may be no more than about ½ inch. Keeper 130 and fixed outer ramp 238 may then be dimensioned accordingly so as to require latch 132 to translate at most about ½ inch to escape strike housing 140. In accordance with an aspect of the invention, the length of extended lobe 232, combined with the width of keeper body portion 231, is dimensioned such that the positive stop created by terminal end 234 defines the maximum travel of latch 132 within housing 140 and ensures that latch 132 is properly laterally positioned within cavity 157.

By way of example and without limitation thereto, and similar to keeper 130 described above, a vertically oriented portion of keeper face 230*b* (i.e. face 230*b* as shown in FIG. 18A) of keeper 130 may be dimensioned to have a length approximately one half of width of housing 140 such that when in a latched position, keeper 130 presents a generally vertical blocking surface to secure latch 132 within cavity 157. When moving to an unlatched position, keeper 130 is able to rotate the angle B, for example, about 45 degrees, relative to a header surface 125 such that the keeper latch face 230*b* is now a ramped surface configured to provide a compact translation of the horizontal door pull force to a vertical force that allows for the ejection of latch 132 from cavity 157 so as to permit opening of the door (see FIGS. 18B-18E). By configuring the vertically oriented portion of keeper face 230*b* to approximately one half of the width that was described above, keeper 130 may complete its rotation within housing 140 to the unlatched position without the need to cut a pocket in header 126 (or header extension) to receive electric strike 124. Furthermore, as seen in FIG. 18E, the combination of keeper body portion 231 and fixed outer ramp 238 operates to effectively replace both ramp surface 19 on standard strike 10 (FIG. 1B) and keeper 28 on electric strike 28 (FIG. 3) without having to make any cuts 32 or forming any new mounting holes 33 in door header 12 (e.g., FIGS. 5A, 5B, 6). While the rotation of keeper 130 is described above as being about 45 degrees, it should be understood that such rotation can be between about 45 and about 60 degrees to accommodate for both ⅝" and ¾" form factors while still allowing electric strike 124 to be surface mounted.

With reference to FIGS. 19A-19F and 20A-20G, a further aspect of the present invention is directed to a modular electric strike concept to accommodate door handle tubes 120*b*, and associated latches disposed therein, that are spaced a different distances from one another. For example, a series of modular electric strikes 124*a*-124*e* are provided to illustrate the versatility of certain components of the door lock assembly 100 to accommodate various installation scenarios. The aspects of the modular electric strikes described herein are adapted to be used with door latch assemblies 110 having various spacing between door handles and their associated latches based on frameless installations or framed installations where different size vertical stiles and/or horizontal rails may be used. The modular electric strikes described herein are not only easily adaptable for various latch spacing scenarios presented during the installation process, but also reduces manufacturing and assembly costs by eliminating the need to design customized electric strikes for different latch spacing scenarios.

Figure 19A:
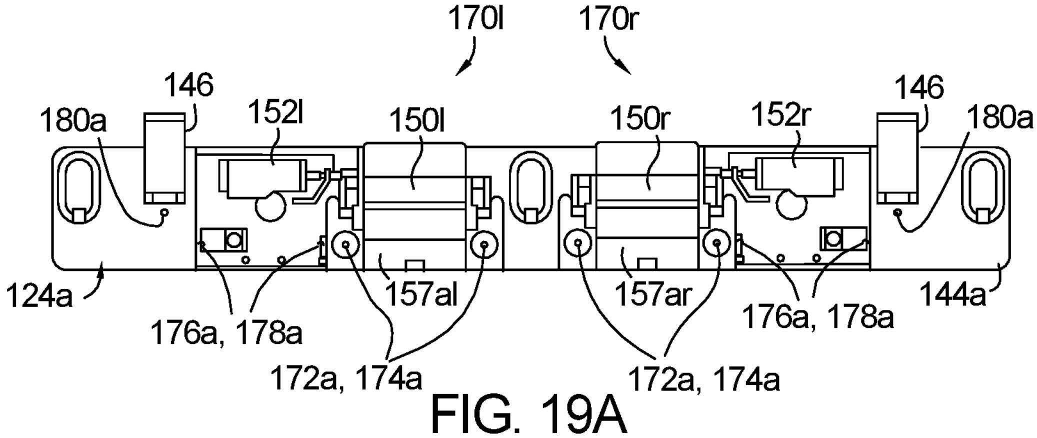
FIGS. 19A-19E are a series of exemplary top plan views of base plates, keeper assemblies, and actuator assemblies shown in different configurations to illustrate the modularity aspect of the present invention.
Figure 20A:
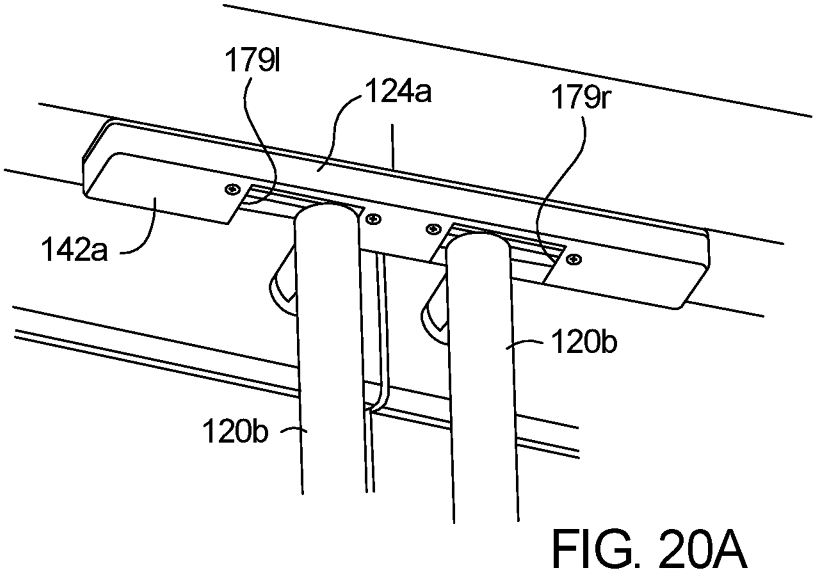
FIGS. 20A-20G is a series of perspective views that correspond to the different modular electric strike configurations shown in FIGS. 19A-19F (including respective cover plates) to accommodate various spaced tubular door hardware handles for a double door arrangement (e.g., 3", 4⅝", 5", 5⅝", 8⅜" spacing)

By way of example and without limitation thereto, modular electric strike 124*a*, shown in FIGS. 19A and 20A, is configured for use within a door latch assembly 110 having a 3 inch latch spacing. To accommodate a 3 inch latch spacing, keeper assemblies 150*l* and 150*r* are mounted to base plate 144*a* so that keeper assemblies 150*l*, 150*r* and the respective cavities 157*al*, 157*ar* are spaced apart 3 inches on-center. As seen in FIG. 19A, keeper assemblies 150*l*, 150*r* are respectively mounted to first and second sides 170*l*, 170*r* of base plate 144*a* using one or more first mounting points 172*a* and associated fasteners 174*a*. Due to the relative close proximity of keeper assemblies 150*l*, 150*r*, actuator assemblies 152*l* and 152*r* are mounted to base plate 144*a* outwardly from keeper assemblies 150*l*, 150*r*, and door bumpers 146 are mounted outward of actuator assemblies 152*l*, 152*r* at a mounting point 180*a*. Actuator assemblies 152*l*, 152*r* are respectively mounted to first and second sides 170*l*, 170*r* of base plate 144*a* using one or more second mounting points 176*a* and associated fasteners 178*a*. Base plate 144*a* may be formed using CNC machining to accurately and cost effectively provide the appropriate size and spacing of the mounting points 172*a*, 176*a* for keeper assemblies 150*l*, 150*r*, actuator assemblies 152*l*, 152*r*, cavities 157*al*, 157*ar*, and door bumpers 146.

Figure 19B:
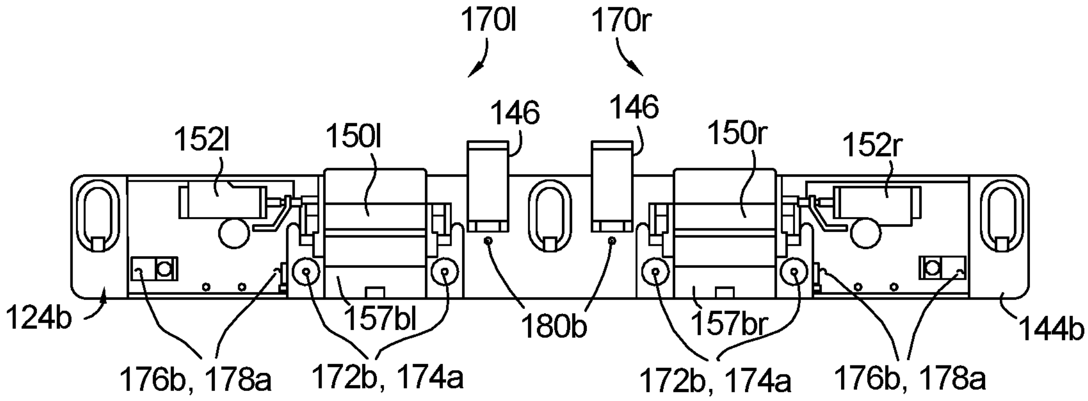
Figure 20B:
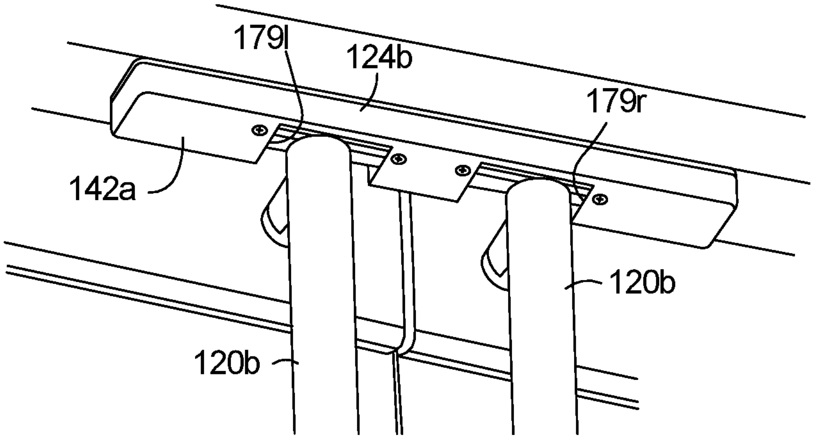

In an additional example and without limitation thereto, modular electric strike 124*b*, shown in FIGS. 19B and 20B, is configured for use within a door latch assembly 110 having a 4⅝ inch latch spacing. To accommodate a 4⅝ inch latch spacing, keeper assemblies 150*l* and 150*r* are mounted to base plate 144*b* so that keeper assemblies 150*l*, 150*r* and the respective cavities 157*bl*, 157*br* are spaced apart 4⅝ inches on-center. As seen in FIG. 19B, keeper assemblies 150*l*, 150*r* are respectively mounted to first and second sides 170*l*, 170*r* of base plate 144*b* using one or more third mounting points 172*b* and associated fasteners 174*a*. Due to the position of keeper assemblies 150*l*, 150*r*, actuator assemblies 152*l* and 152*r* are mounted to base plate 144*b* outwardly from keeper assemblies 150*l*, 150*r*, and door bumpers 146 are mounted inward of actuator assemblies 152*l*, 152*r* at mounting point 180*b*. Actuator assemblies 152*l*, 152*r* are respectively mounted to first and second sides 170*l*, 170*r* of base plate 144*b* using one or more fourth mounting points 176*b* and associated fasteners 178*a*. Based plate 144*b* may be formed using CNC machining, laser cutting or punching to accurately and cost effectively provide the appropriate size and spacing of the mounting points for keeper assemblies 150*l*, 150*r*, actuator assemblies 152*l*, 152*r*, cavities 157*al*, 157*ar*, and door bumpers 146.

As can be seen from the examples shown in FIGS. 19A and 19B, all of the same strike components (i.e., keeper assemblies 150*l*, 150*r*, actuator assemblies 152*i*, 152*r*, and door bumpers 146) are used to assemble electric strikes 124*a* and 124*b*, except that different base plates 144*a*, 144*b* are provided, which include mounting points (172, 174, 176, 178, 180) positioned in different locations on base plates 144*a*, 144*b*. Given that base plates 144*a*, 144*b* can be manufactured in a cost and time effective manner (e.g., using CNC machining), this results in a modular method of providing surface mounted electric strikes that can be adapted to various installation scenarios.

Figure 19C:
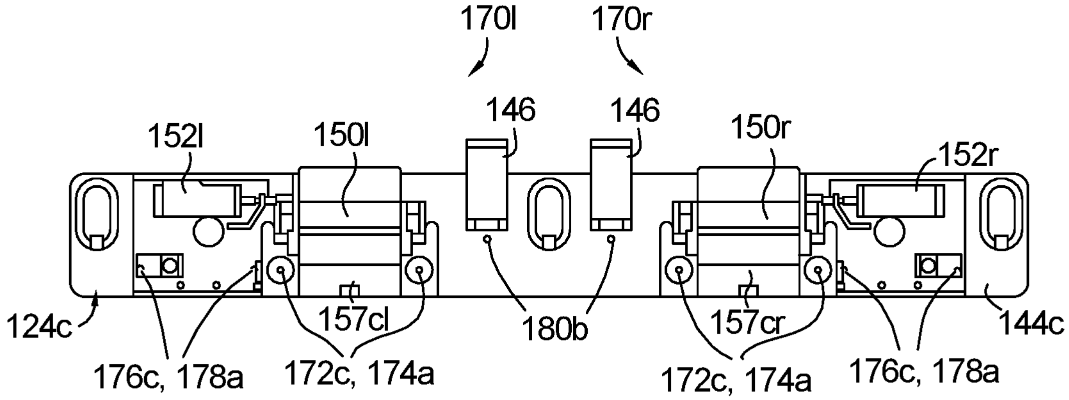
Figure 20C:
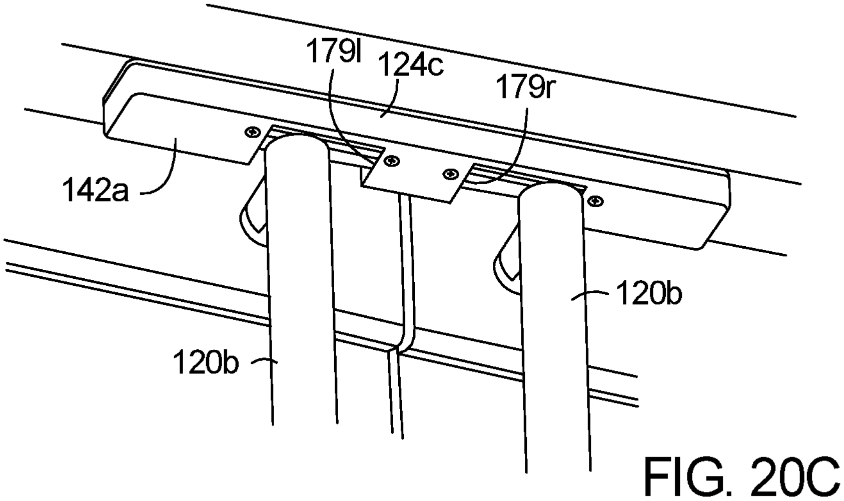

In yet another example of using common strike components with a different base plate, modular electric strike 124*c* shown in FIGS. 19C and 20C is configured for use within a door latch assembly 110 having a 5 inch latch spacing. To accommodate a 5 inch latch spacing, keeper assemblies 150*l*, 150*r* are respectively mounted to first and second sides 170*l*, 170*r* of base plate 144*c* so that keeper assemblies 150*l*, 150*r* and the respective cavities 157*cl*, 157*cr* are spaced apart 5 inches on-center. As best seen in FIG. 19C, keeper assemblies 150*l*, 150*r* are mounted to base plate 144*c* using one or more fifth mounting points 172*c* and associated fasteners 174*a*. Similar to electric strike 124*b*, actuator assemblies 152*l*, 152*r* are mounted to base plate 144*c* outwardly from keeper assemblies 150*l*, 150*r*, and door bumpers 146 are mounted inward of actuator assemblies 152*l*, 152*r* at mounting point 180*b*. Actuator assemblies 152*l*, 152*r* are respectively mounted to first and second sides 170*l*, 170*r* of base plate 144*c* using one or more sixth mounting points 176*c* and associated fasteners 178*a*. Based plate 144*c* may be formed using CNC machining to accurately and cost effectively provide the appropriate size and spacing of the mounting points for keeper assemblies 150*l*, 150*r*, actuator assemblies 152*l*, 152*r*, cavities 157*al*, 157*ar*, and door bumpers 146.

As can be seen in FIGS. 19A-19C, the same keeper assemblies 150*l*, 150*r*, actuator assemblies 152*l*, 152*r*, and door bumpers 146 may be used to assemble each of modular electric strikes 124*a*, 124*b*, 124*c*, with the only difference being the different base plates 144*a*, 144*b*, 144*c* that are used to provide for the appropriate mounting points for these components to accommodate the different latch spacing. The use of the same components (i.e., keeper assemblies 150*l*, 150*r*, actuator assemblies 152*l*, 152*r*, and door bumpers 146) combined with the ease and low cost of providing various base plates 144*a*, 144*b*, 144*c* for use with the different variations shown in FIGS. 19A-19C provide a robust solution for accommodating latch arrangements with different spacing. Furthermore, as best seen in FIGS. 20A-20C, housing cover 142*a* includes an aperture 179*l*, 179*r* defined therein that is large enough to accommodate the different positions of keeper assemblies 150*l*, 150*r* shown in FIGS. 19A-19C, thereby allowing the same housing cover 142*a* for each of these variations and further enhancing the modular electric strike concept described herein.

Figure 19D:
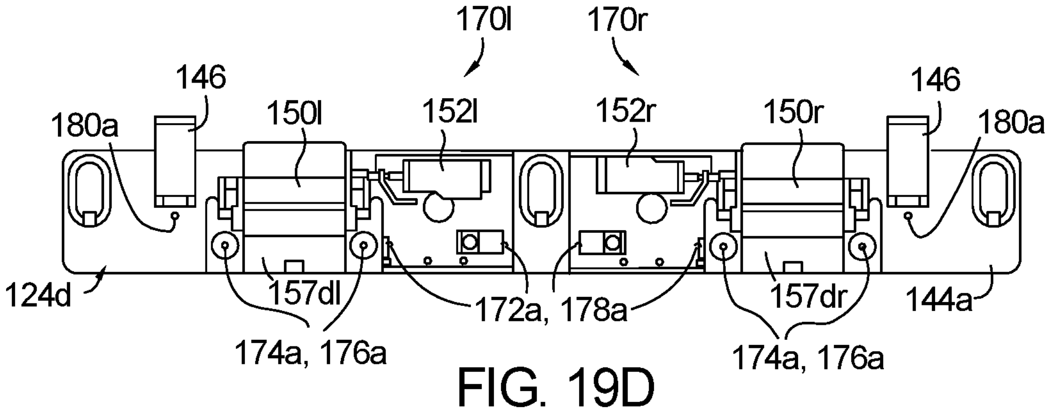
Figure 20D:
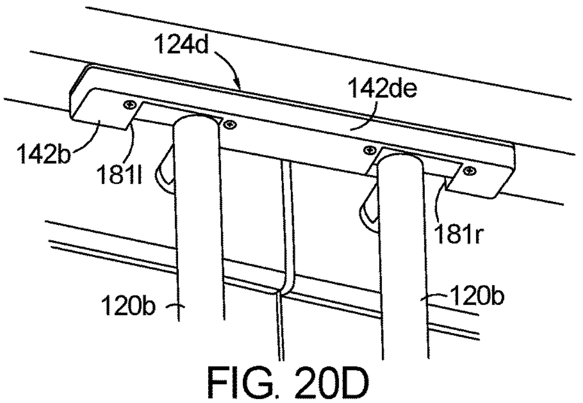

As by way of a further example and without limitation thereto, electric strike 124*d*, shown in FIGS. 19D and 20D, is configured for use within a door latch assembly 110 having a 5⅝ inch latch spacing. To accommodate a 5⅝ inch latch spacing, keeper assemblies 150*l*, 150*r* may be mounted to the same base plate 144*a* that was used in FIG. 19A to allow keeper assemblies 150*l*, 150*r* and the respective cavities 157*dl*, 157*dr* to be spaced apart 5⅝ inches on-center. However, in this instance, due to the position of keeper assemblies 150*l*, 150*r* and the space required for bumpers 146, keeper assemblies 150*l*, 150*r* are respectively mounted to first and second sides 170*l*, 170*r* of base plate 144*a* using the one or more second mounting points 176*a* (and fasteners 174*a*) outwardly from actuator assemblies 152*l*, 152*r*, and actuator assemblies 152*l*, 152*r* are respectively mounted to first and second sides 170*l*, 170*r* of base plate 144*a* using one or more first mounting points 172*a* (and fasteners 178*a*). Therefore, the same base plate 144*a* is used in the examples shown in FIGS. 19A and 19D, but the mounting locations of the keeper assemblies and actuator assemblies are swapped to accommodate for different latch spacing. Door bumpers 146 are mounted outward of cavities 157*dl*, 157*dr* at mounting points 180*a*, as was the case in FIG. 19A. As illustrated from this example, the modularity aspect of the present invention is further enhanced given that the same base plate can be used along with similar keeper assemblies, actuator assemblies and bumpers to accommodate latches having different spacing.

Figure 19E:
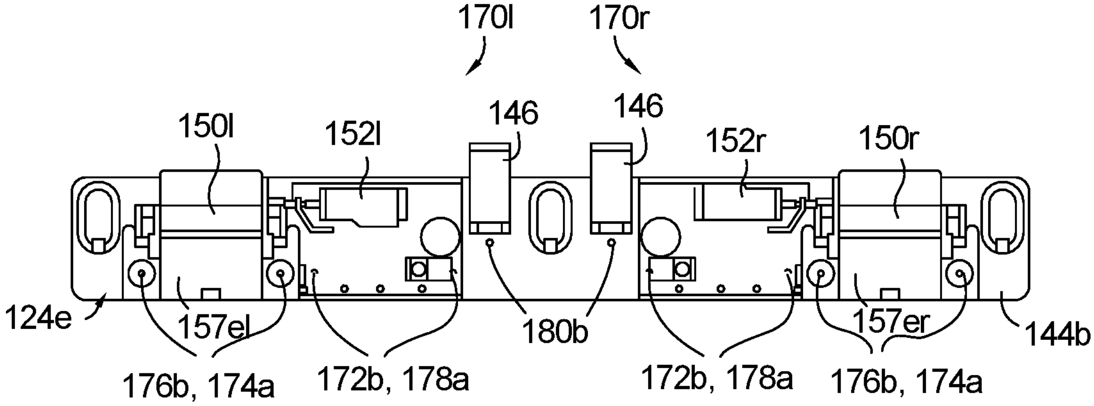
Figure 19F:
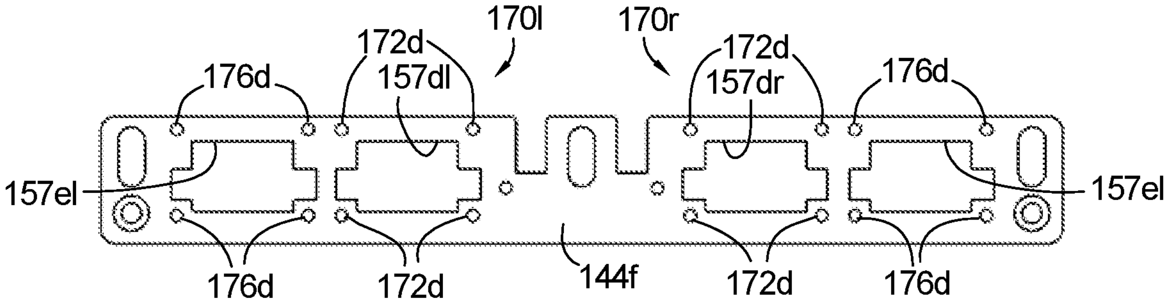
FIG. 19F is a plan view of a universal base plate that can be used to implement the modularity aspect of the present invention shown in FIGS. 19G and 19H.
Figure 20E:
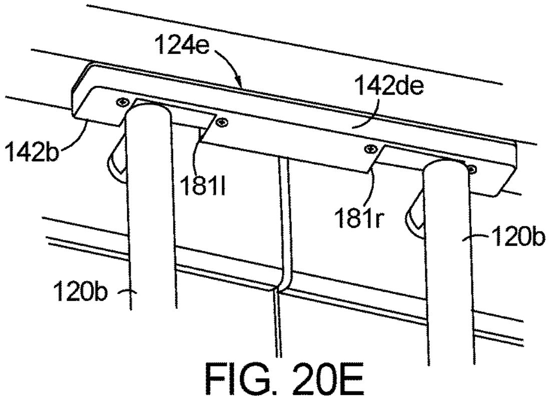

In a further non-limiting example of the ability to use a common base plate to accommodate various latch spacing configurations, electric strike 124*e*, shown in FIGS. 19E and 20E, is configured for use within a door latch assembly 110 having an 8⅜ inch latch spacing. To accommodate an 8⅜ inch latch spacing, keeper assemblies 150*l*, 150*r* are mounted to base plate 144*b*, which was used in FIG. 19B to allow keeper assemblies 150*l*, 150*r* and the respective cavities 157*el*, 157*er* to be spaced apart 8⅜ inches on-center. In this instance, due to the position of keeper assemblies 150*l*, 150*r*, actuator assemblies 152*l*, 152*r* are mounted to first and second sides 170*l*, 170*r* of base plate 144*b* using one or more third mounting points 172*b* (and fasteners 178*a*) inwardly from keeper assemblies 150*l*, 150*r*, and door bumpers 146 are mounted inwardly of actuator assemblies 152*l*, 152*r* at mounting points 180*b* using associated fasteners. Keeper assemblies 150*l*, 150*r* are mounted to first and second sides 170*l*, 170*r* of base plate 144*b* using one or more fourth mounting points 176*b* and associated fasteners 174*a*. Again, the modularity concept is further illustrated whereby the same base plate 144*b* is used in the examples shown in FIGS. 19B and 19E, but the points of the keeper assemblies and actuator assemblies are swapped to accommodate for different latch spacing.

To further demonstrate the modularity concept described above, and with further reference to FIGS. 19F-19H, an exemplary universal base plate 144*f* is provided. Base plate 144*f* may be configured to include various mounting points on first and second sides 170*l*, 170*r* thereof to allow electric strike modules 177*r*, 177*l* to be mounted thereto to accommodate latches with various spacing dictated by the spacing of tubular handles 120*b*. In particular, base plate 144*f* may provide different mounting points 172*d*, 176*d* for selectively mounting modules 177*r*, 177*l* using one or more fasteners 156*a*, 156*b*. Base plate 144*f* may also have apertures 157*dl*, 157*dr*, 157*el*, 157*er* defined therein to accommodate modules 177*r*, 177*l*, and mounting points 180*d* for mounting bumpers 146.

Figure 19G:
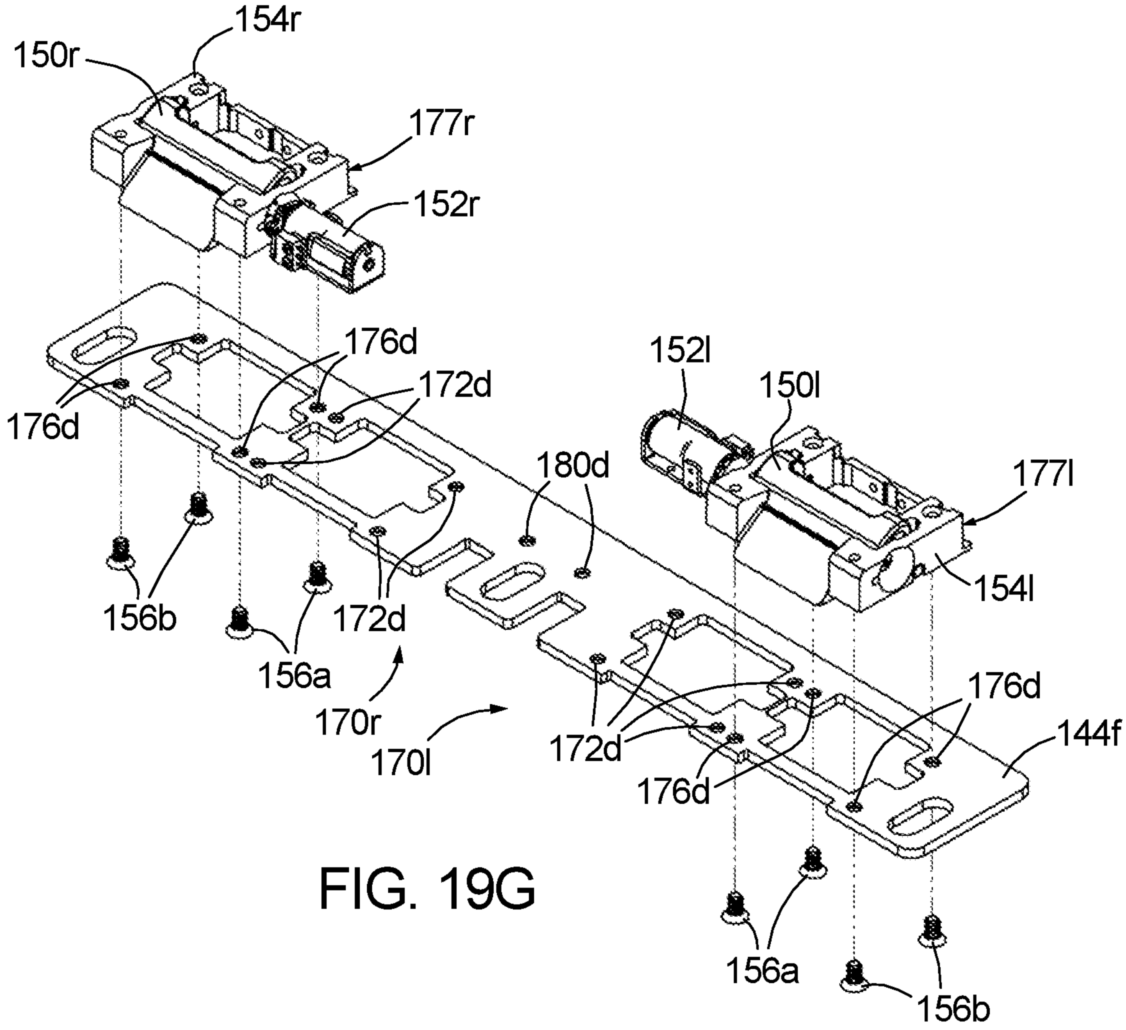
FIG. 19G is an exploded view of a pair of electric strike modules mounted to the base plate shown in FIG. 19F at a first spacing in accordance with the modularity aspect of the present invention.
Figure 19H:
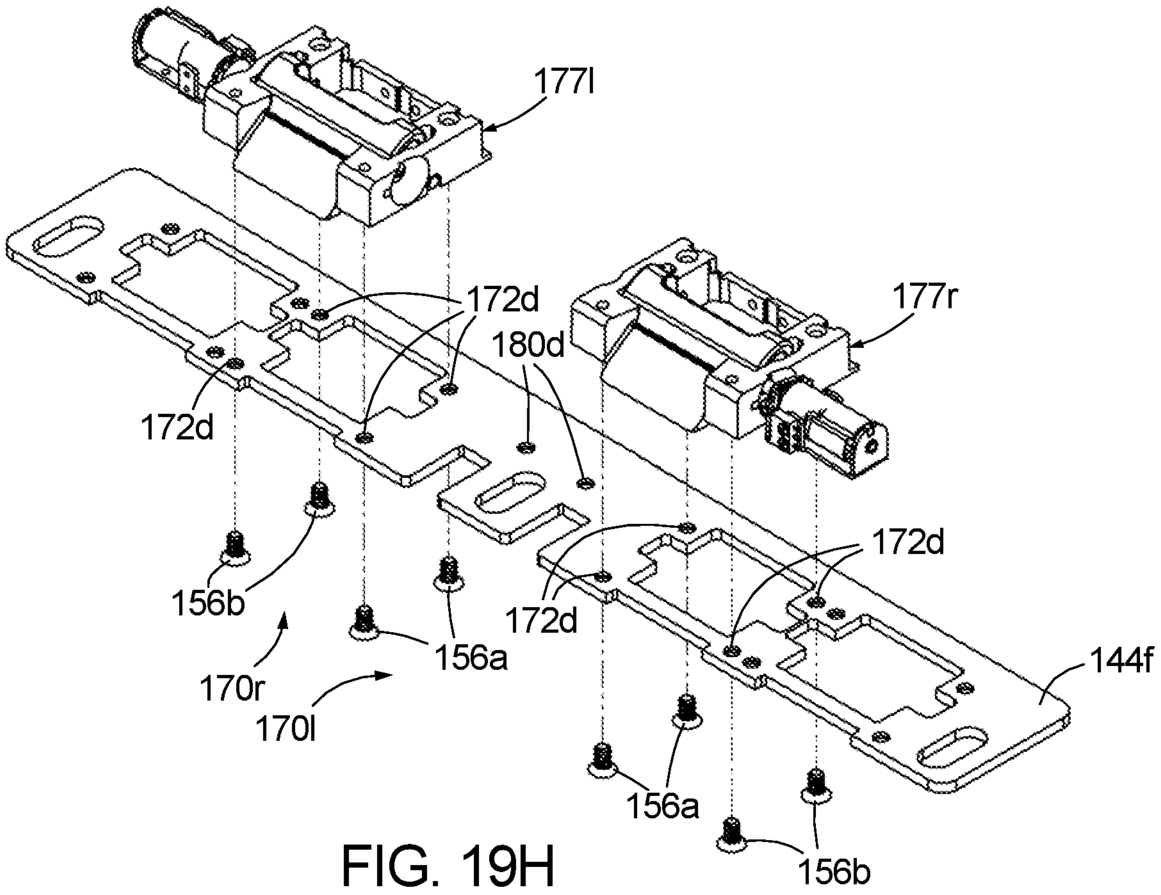
FIG. 19H is an exploded view of the electric strike modules shown in FIG. 19G mounted to the base plate at a second spacing.

As best seen in FIG. 19G, each electric strike module 177*r*, 177*l* may include a respective keeper assembly 150*r*, 150*l* rotatably mounted to header 154*r*, 154*l* and an associated actuator assembly 152*r*, 152*l*. In the example shown in FIG. 19G, modules 177*r*, 177*l* can be mounted to mounting points 176*d* on first and second sides 170*l*, 170*r* of base plate 144*f* using fasteners 156*a*, 156*b* to accommodate a latch spacing of $8\frac{3}{8}$ inches. In accordance with an aspect of the present invention, as best seen in FIG. 19H, modules 177*r*, 177*l* can be easily repositioned on base plate 144*f* so they are mounted to mounting points 172*d* on opposite sides 170*l*, 170*r* using fasteners 156*a*, 156*b* to accommodate a latch spacing of $4\frac{5}{8}$ inches where tubular handles 120*b* are positioned closer to one another compared to the scenario in FIG. 19G. From the two examples shown in FIGS. 19G and 19H, it can be seen that modules 177*r*, 177*l* can be easily repositioned on a universal base plate 144*f* to accommodate various handle 120*b* spacing without the need to use entirely different electric strikes. The modularity concept provided herein not only provides simplifies the manufacturing process in that a common module 177 can be provided for multiple latch spacing scenarios, but also allows for flexibility in the field during the installation process.

Having described the structural aspects of the modularity concept set forth above, various exemplary methods of assembling the modular electric strike will now be provided.

In view of the above, and accordance with one aspect of the invention set forth herein, a method of assembling a modular electric strike for use with a door latch assembly to selectively secure a pair of side-by-side first and second doors disposed within a door frame is provided using a common set of components selectively mounted to a common base plate on various mounting locations depending on the positioning of first and second latches. With respect to the exemplary method described below, the door latch assembly includes respective first and second door latches that are spaced apart at a first distance. The method comprises providing first and second keeper assemblies; providing first and second actuator assemblies for association with the first and second keeper assemblies; providing a base plate including: i) first and second openings defined therein that are spaced apart at a second distance; ii) first mounting points associated with the first and second openings; iii) third and fourth openings defined therein that are spaced apart at a third distance; and iv) second mounting points associated with the third and fourth openings. The method further comprises the steps of determining whether the first distance matches the second distance or the third distance, and based on such determination: mounting the keeper assemblies to the mounting points associated with the openings corresponding to the second distance or third distance that matches the first distance, and mounting the actuator assemblies to the mounting points associates with the openings corresponding to the other of the second distance or third distance that does not match the first distance. The method may further include connecting a housing cover to the base plate, wherein the housing cover includes first and second apertures defined therein, and wherein the first and second apertures correspond with the respective openings defined in the selected base plate that are associated with the mounted keeper assemblies. It should be understood that the above-referenced method also may be implemented in the instance that the base plate does not include the first, second, third and/or fourth openings defined therein.

In accordance with another aspect of the invention set forth herein, a method of assembling a modular electric strike for use with a door latch assembly to selectively secure a pair of side-by-side first and second doors disposed within a door frame is provided by using a common set of components with one of first and second base plates. With respect to the exemplary method described below, the door latch assembly includes respective first and second door latches that are spaced apart at a first distance. The method comprises providing first and second keeper assemblies; providing first and second actuator assemblies for association with the first and second keeper assemblies; providing the first base plate having first and second openings defined therein that are spaced apart at a second distance, wherein the first base plate provides respective first mounting points for the first and second keeper assemblies and respective second mounting points for the first and second actuator assemblies; and providing the second base plate having third and fourth openings defined therein that are spaced apart at a third distance, wherein the second base plate provides respective third mounting points for the first and second keeper assemblies and fourth mounting points for the first and second actuator assemblies. The method further comprises the steps of determining whether the first distance matches the second distance or the third distance, and based on such determination, selecting the first base plate or the second base plate for assembling the electric strike; mounting the first and second keeper assemblies and the first and second actuator assemblies to the respective mounting points on the selected base plate; and connecting a housing cover to the selected base plate, wherein the housing cover includes first and second apertures defined therein, and wherein the first and second apertures generally align with the respective openings defined in the selected base plate. It should be understood that the above-referenced method also may be implemented in the instance that the first base plate does not include the first and/or second openings defined therein, and the second base plate does not include the third and/or fourth openings defined therein.

In yet another aspect, a method for providing a modular surface mounted electric strike is provided for use with a door latch assembly to selectively secure a pair of side-by-side first and second doors when in a door closed position in a door frame. The door latch assembly includes a first latch and a second latch associated with the first and second doors respectively, wherein the first latch and the second latch are spaced apart at a first distance. The method comprises: providing first and second keeper assemblies; providing a first actuator assembly for association with the first keeper assembly, and a second actuator assembly for association with the second keeper assembly; providing a first base plate having a first side and a second side, wherein each of the first side and the second side of the first base plate include at least one first keeper mounting point configured to attach a respective one of the first keeper assembly and the second keeper assembly, wherein the at least one first keeper mounting point on the first side of the first base plate is spaced apart at a second distance from the at least one keeper mounting point on the second side of the first base plate; and providing a second base plate having a first side and a second side, wherein each of the first side and the second side of the second base plate include at least one second keeper mounting point configured to attach a respective one of the first keeper assembly and the second keeper assembly, wherein the at least one second keeper mounting point on the first side of the second base plate is spaced apart at a third distance from the at least one keeper mounting point on the second side of the second base plate. When the first distance matches the second distance: i) attaching the first keeper assembly to the first base plate at the at least one first keeper mounting point on the first side of the first base plate, and associating the first actuator assembly with the first keeper assembly, and ii) attaching the second keeper assembly to the first base plate at the at least one first keeper mounting point on the second side of the first base plate, and associating the second actuator assembly with the first keeper assembly. When the first distance matches the third distance: i) attaching the first keeper assembly to the second base plate at the at least one second keeper mounting point on the first side of the second base plate, and associating the first actuator assembly with the first keeper assembly, and ii) attaching the second keeper assembly to the second base plate at the at least one second keeper mounting point on the second side of the second base plate, and associating the second actuator assembly with the first keeper assembly.

In another aspect, a method of configuring a surface mounted electric strike is provided for use with a door latch assembly to selectively secure a pair of side-by-side first and second doors when in a door closed position in a door frame, wherein the door latch assembly includes a first latch and a second latch associated with the first and second doors respectively. The method comprises: providing a universal base plate having a first side and a second side, wherein each of the first side and the second side include at least one first mounting point and at least one second mounting point; providing a first electric strike module including a first header, a first keeper assembly mounted to the first header, and a first actuator assembly, wherein the first actuator assembly is configured for moving between a first mode for preventing the first keeper assembly from moving toward an unlatched position and a second mode for permitting the first keeper assembly to move toward the unlatched position; and providing a second electric strike module including a second header, a second keeper assembly mounted to the second header, and a second actuator assembly, wherein the second actuator assembly is configured for moving between a third mode for preventing the second keeper assembly from moving toward the unlatched position and a fourth mode for permitting the second keeper assembly to move toward the unlatched position. When the first latch and the second latch are separated a first distance in the door closed position, the method includes: i) attaching the first electric strike module to the at least one first mounting location on the first side of the universal base plate, and ii) attaching the second electric strike module to the at least one first mounting location on the second side of the universal base plate. When the first latch and the second latch are separated a second distance in the door closed position, the method includes: i) attaching the first electric strike module to the at least one second mounting location on either the first side or the second side of the universal base plate, and ii) attaching the second electric strike module to the at least one second mounting location on the other of the first side or the second side of the universal base plate.

Figure 20F:
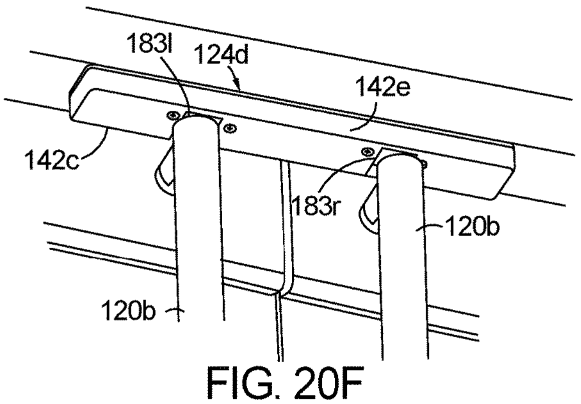
Figure 20G:
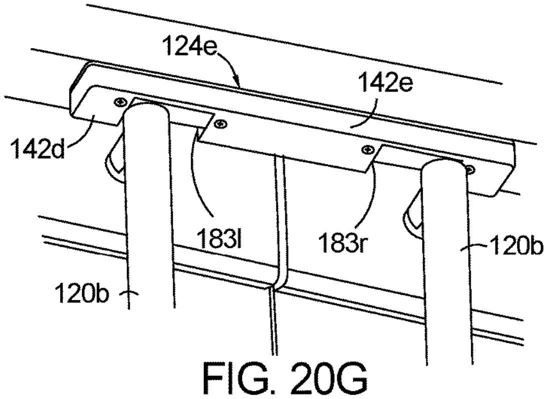

Instead of providing universal housing cover **142*b* that includes an aperture 181*l*, 181*r* large enough to receive the latch spacing shown in FIGS. 20D, 20E, it is also contemplated that housing covers 142*c*, 142*d*, respectively, be used having respective apertures 183*l*, 183*r* to accommodate the specific latch spacing shown in FIGS. 20F and 20**G.

Figure 21A:
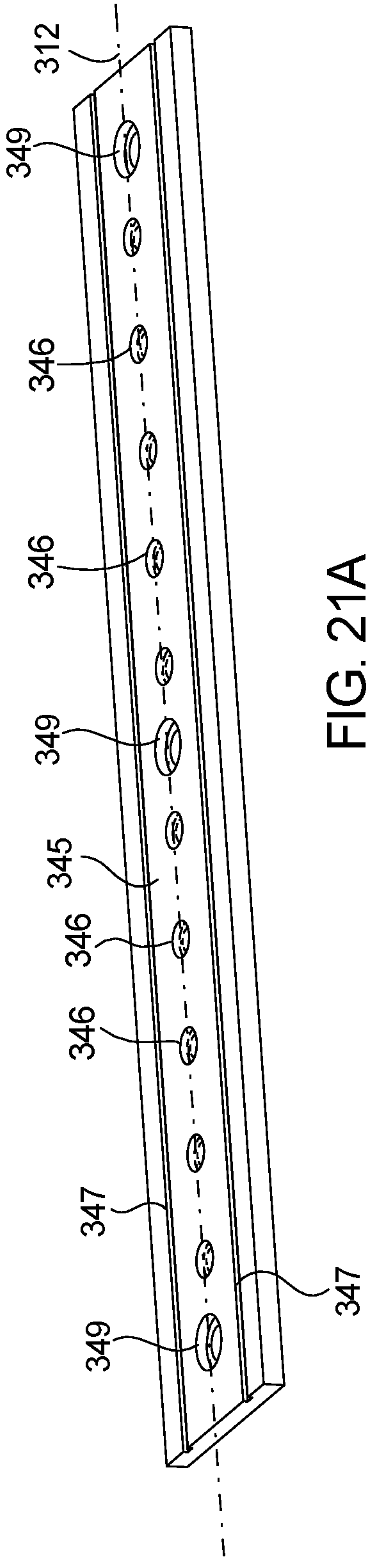
FIG. 21A is a perspective view of an exemplary base plate configured for use within an alternative exemplary overhead surface mounted electric strike for use with framed double doors in accordance with an aspect of the present invention.
Figure 21B:
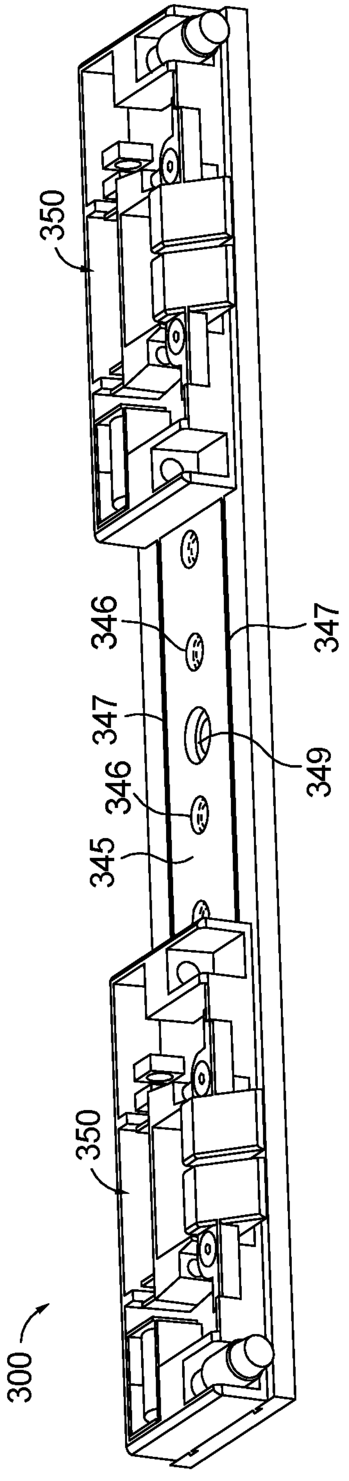
FIG. 21B is a perspective view of the exemplary base plate shown in FIG. 21A with two alternative exemplary overhead surface mounted electric strikes slidably engaged with the base plate.

In another aspect of the present invention, and turning to FIGS. 21A and 21B, an alternative surface mount electric strike system 300 is provided. Electric strike system 300 (shown without a cover) is configured to permit selective lateral placement 310 of one or more electric strikes 350 along a longitudinal axis 312 of a universal base plate 345. By way of example and without limitation thereto, base plate 345 may include one or more slots 347, such as a groove or dovetail, while each electric strike 350 may include a corresponding mating feature 314 (FIG. 22A), such as a tongue, elongated ridge, pin, which is configured to be slidably received within slot 347. While base plate 345 is described as including slot 347 and electric strike 350 is described as including the corresponding mating feature 314, it should be noted that the location of the slot and corresponding mating feature may be swapped to equal effect.

Figure 22A:
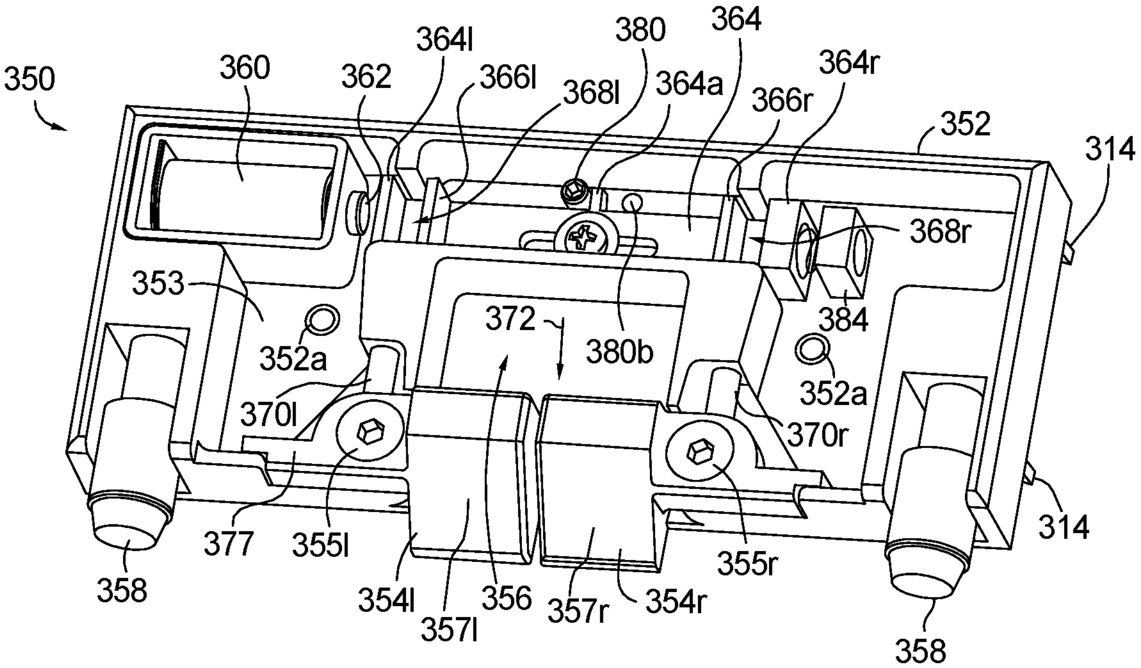
FIG. 22A is a top perspective view of an exemplary electric strike unit shown in FIG. 21B shown in a fail-safe mode.

To secure electric strike 350 to base plate 345, base plate 345 may include a plurality of threaded bores 346 while housing 352 of electric strike 350 may include one or more mounting bores **352*a* defined in a back wall 353 of housing 352 (see FIG. 22A, also note that mounting bores 352*a* have been omitted from FIGS. 22B, 22C and 23A-23C for sake of clarity). Electric strike 350 may then be laterally positioned along base plate 345 until mounting bores 352*a* align with the desired threaded bores 346 on base plate 345. Respective fasteners, such as a machine screw or bolt, (not shown) may then securely fasten electric strike 350 to base plate 345. In one aspect of the invention, base plate 345 may include a series of equally spaced-apart threaded bores 346** so as to accommodate lateral strike placement/spacing as desired or as dictated by the installation.

Figure 24:
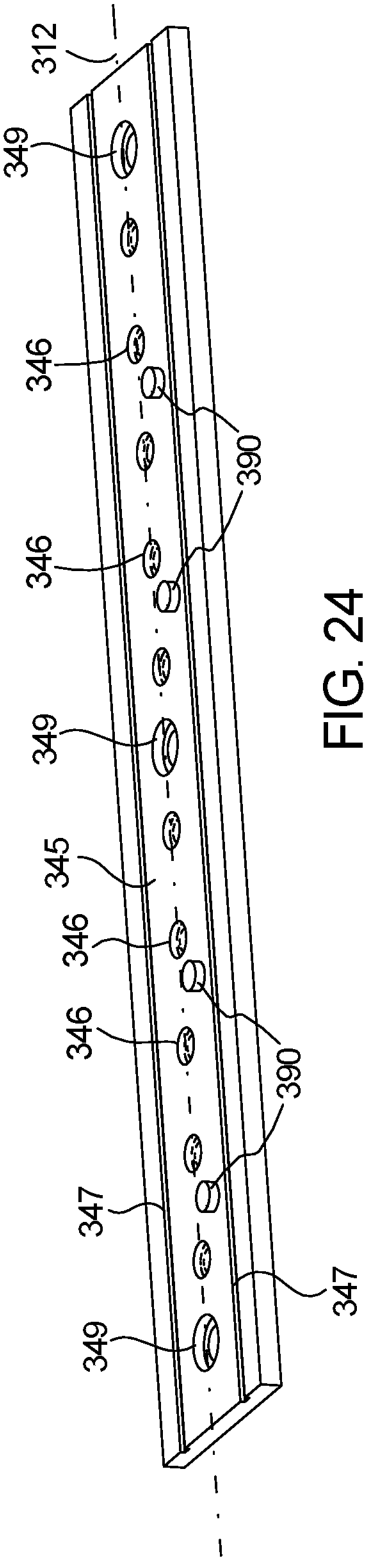
FIG. 24 is a perspective view showing another exemplary embodiment of a base plate.
Figure 25:
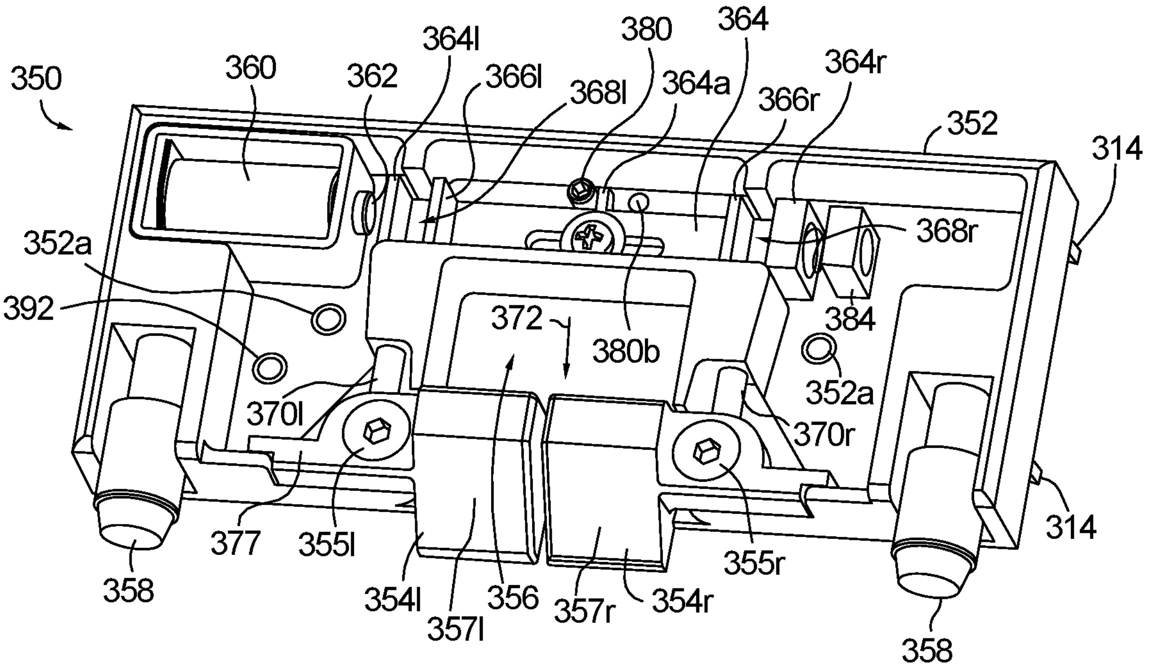
FIG. 25 is a top perspective showing another exemplary embodiment of the electric strike unit that can be used with the base plate shown in FIG. 24.

Other types of methods of selectively locating and fixedly positioning electric strike 350 to base plate 345 are also contemplated herein. For example, As seen in FIG. 24, instead of, or in addition to, using one or more slots 347 to locate electric strike 350 on base plate 345, it is contemplated that base plate 345 may include a plurality of pins 390 or other locating features that extend from, or otherwise associated with, the face surface that represent various locations that electric strike 350 can be placed on base plate 345. For example, pins 390 or locating features may be positioned along or in parallel with the longitudinal axis 312 of base plate 345. Further, with additional reference to FIG. 25, electric strike 350 may have one or more apertures 392 formed therein that are configured for accepting one or more of pins 390 or other locating features to locate electric strike 350 on base plate 345 in a desired position to align with a corresponding latch. To fasten electric strike 350 on base plate 345, it is contemplated that respective apertures 352*a* be formed in electric strike 350 and base plate 345 to accept a fastener to secure electric strike 350 to base plate 345.

Base plate 345 may also be prefabricated to include one or more mounting apertures 349. In accordance with an aspect of the present invention, when retrofitting a door latch assembly, mounting apertures 349 may be positioned so as to coincide with apertures on the preexisting base plate so as to afford quick and easy installation of base plate 345 (and electric strike 350) to the door frame. Electric strike system 300 may also provide an additional advantage in that base plate 345 may be located and mounted onto the door frame without the added weight and bulk of the electric strike 350. Other methods of mounting base plate 345 to the door frame are also contemplated herein, such as, for example, using an adhesive or other fastening methods. Electric strike 350 may then be selectively mounted and positioned along the longitudinal axis 312 of base plate 345 after base plate 345 has been secured to the frame so that electric strike 350 can be aligned to receive a respective latch when the door is moved to a closed position.

Figure 22B:
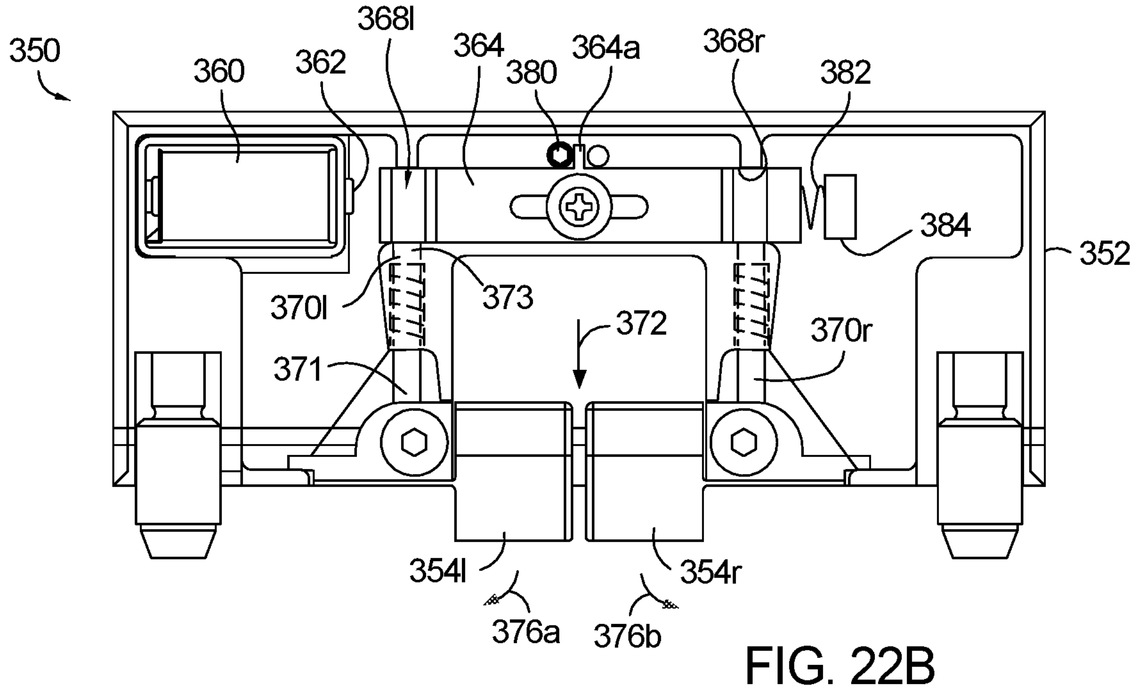
FIG. 22B is a top plan view of the exemplary electric strike unit shown in FIG. 22A showing the electric strike in an unpowered and unlocked state.
Figure 22C:
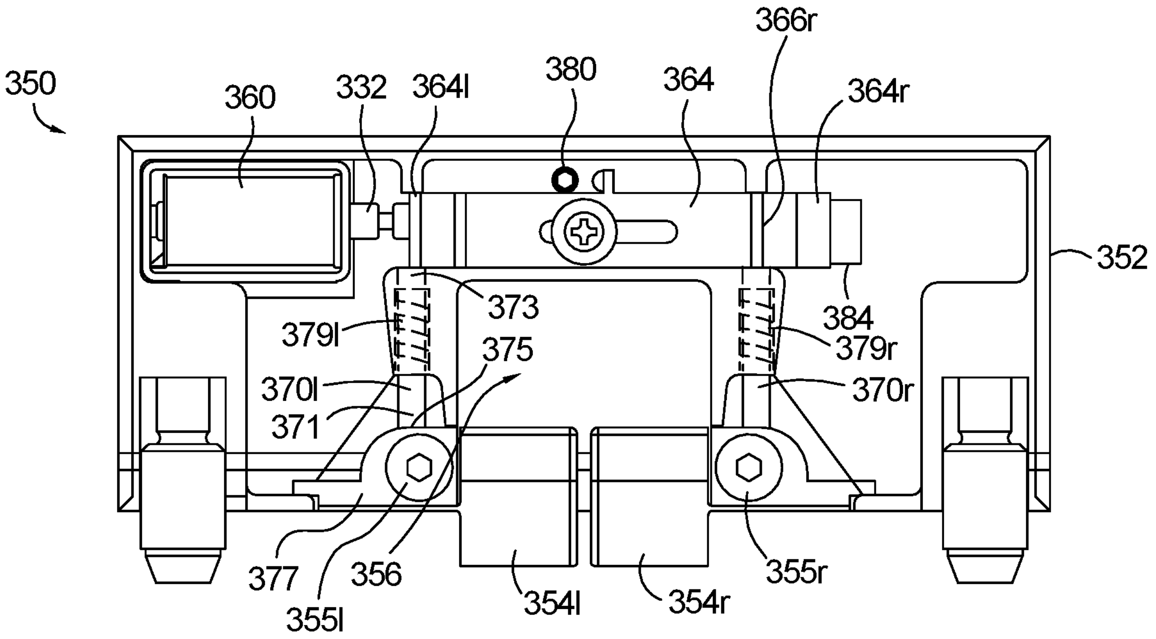
FIG. 22C is a top plan view of the exemplary electric strike unit shown in FIG. 22B showing the electric strike in a locked state.

With reference to FIGS. 22A-22C, exemplary electric strike 350 is in a fail-safe mode and generally includes a housing 352 and a pair of keeper arms 354*l*, 354*r* pivotally mounted to housing 352 via pivot pins 355*l*, 355*r*, so as to define a latch cavity 356 configured to releasably receive a door latch (e.g., door latch 132) therein when the door is in a closed position. Housing 352 may further include one or more bumpers 358 that are configured to abut the door when the door latch is positioned within cavity 356. An actuator 360 (e.g., solenoid) is mounted in housing 352 and includes a plunger 362 selectively engageable with an end of a slide bar 364 when actuator 360 is cycled between powered and unpowered states as will be discussed in greater detail below. Slide bar 364 further includes a pair of blocking members 366*l*, 366*r* located a spaced distance from opposing block ends 364*l*, 364*r* to define respective channels 368*l*, 368*r*. Respective slide pins 370*l*, 370*r* are disposed between respective keeper arms 354*l*, 354*r* and respective block ends 364*l*, 364*r* and respective channels 368*l*, 368*r*.

Each of slide pins 370*l*, 370*r* include a first end 371 and a second end 373. When electric strike 350 is in a locked state (e.g., FIG. 22C), first end 371 of each slide pin 370*l*, 370*r* is in direct contact with a cam surface 375 of a lever arm 377 of respective keeper arm 354*l*, 354*r*. Further, second end 373 of each slide pin 370*l*, 370*r* may be in direct contact with an associated block end 364 and blocking member 366*r* (FIG. 22C) (or blocking member 366 and block end 364*r* in fail secure mode shown in FIG. 23A). In the locked state, each keeper arm 354*l*, 354*r* is not able to rotate about pivot pins 355*l*, 355*r* given that slide pin 370*l*, 370*r* is pinned between keeper arm 354*l*, 354*r* and slide bar 364.

When in the unlocked position shown in FIG. 22B, withdrawal of latch 132 from cavity 356, such as generally in the direction of arrow 372, causes the latch to engage keeper arms 354*l* and 354*r* to thereby cause pivotal rotation of keeper arm 354*l* in a clockwise direction (arrow 376*a*) and keeper arm 354*r* in a counterclockwise direction (arrow 376*b*). Keeper arms 354*l*, 354*r* are able to rotate about 355*l*, 355*r* because second end 373 of pins 370*l*, 370*r* are aligned with, and able to slide within, respective channels 368*l*, 368*r* of slide bar 364 due to the force imposed on first end 371 of pins 370*l*, 370*r* by cam 375 of keeper arms 354*l*, 354*r*. In other words, rotation of each keeper arm 354*l*, 354*r* engages a respective slide pin 370*l*, 370*r* to thereby drive pin 370*l*, 370*r* into respective channels 368*l*, 368*r* against the bias of respective pin springs 379*l*, 379*r*. Latch 132 may then vacate cavity 356 and move the door towards the open position. Once latch 132 has cleared keeper arms 354*l*, 354*r*, pin springs 376*l*, 376*r* respectively urge slide pins 370*l*, 370*r* to withdraw from their respective channels 368*l*, 368*r*, which in turn causes pins 370*l*, 370*r* to reverse direction and return keeper arms 354*l*, 354*r* to their resting position as shown in FIG. 22B. When closing the door, latch 132 will slide along respective sloped surfaces 357*l*, 357*r* of keeper arms 354*l*, 354*r* until the latch is seated within cavity 356.

As best shown in FIGS. 22A-22C and 23A, 23B, keeper assembly 350 may be quickly and easily configured to operate as a "fail safe" unit or a "fail secure" unit by selectively positioning mode pin 380 within housing 352. Fail safe operation allows the latch to be removed from the keeper and the door to be opened when the actuator is unpowered. Conversely, fail secure operation locks the latch within the keeper when the solenoid is unpowered. Thus, depending upon the intended use and/or location of the doors, keeper assembly 350 may be interchangeably switched between operating modes.

With reference to FIGS. 22A-22C, keeper assembly 350 may be placed in the "fail safe" operating mode by securing mode pin 380 in a first pin location. By way of example, mode pin 380 may be threadably or slidably received within a corresponding threaded aperture 380*a* formed on housing 352 (see FIG. 23C). Slide block 364 includes an outwardly extending travel stop 364*a* which may selectively engage with mode pin 380 as will be discussed in greater detail below. Slide spring 382 is positioned within spring housing 384 and is configured to provide a biasing force to drive slide block 364 toward actuator 360.

As shown in FIG. 22B, when actuator 360 is unpowered, slide spring 382 biases slide block 364 toward actuator 360 until travel stop 364*a* engages mode pin 380. This aligns pins 370*l*, 370*r* with their respective channels 368*l*, 368*r*. As a result, latch 132 may be released from keeper arms 354*l*, 354*r* as described above such that the door may be opened.

However, as shown in FIG. 22C, when actuator 360 is powered, plunger 362 engages block end 364*l* of slide bar 364 and drives slide bar 364 toward spring housing 384 until block end 364*r* abuts spring housing 384. Potential energy is the stored within slide spring 382 while pins 370*l*, 370*r* align respectively with block end 364*l* and blocking member 366*r*. This alignment prevents travel of pins 370*l*, 370*r* within respective channels 368*l*, 368*r* which further prevents the pivotal rotation of keeper arms 354*l*, 354*r* about pivot pins 355*l*, 355*r*. As a result, the latch is secured within cavity 356 and the door is in a closed and locked condition.

Figure 23A:
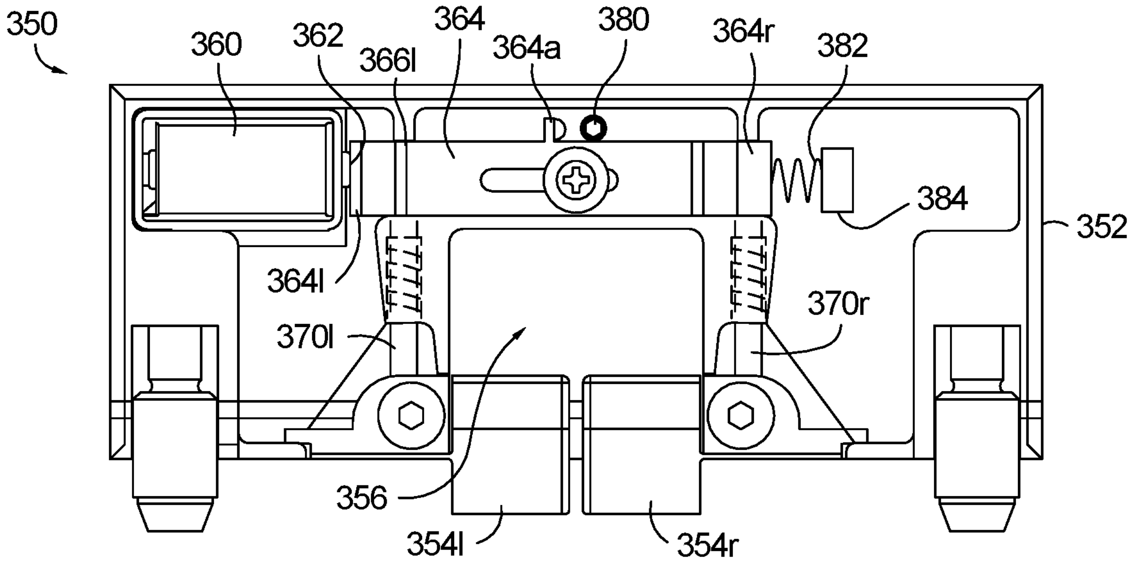
FIG. 23A is a top perspective view of the exemplary electric strike unit shown in FIG. 22B except that the electric strike is in a fail-secure mode, wherein the electric strike is shown in an unpowered and locked state.
Figure 23B:
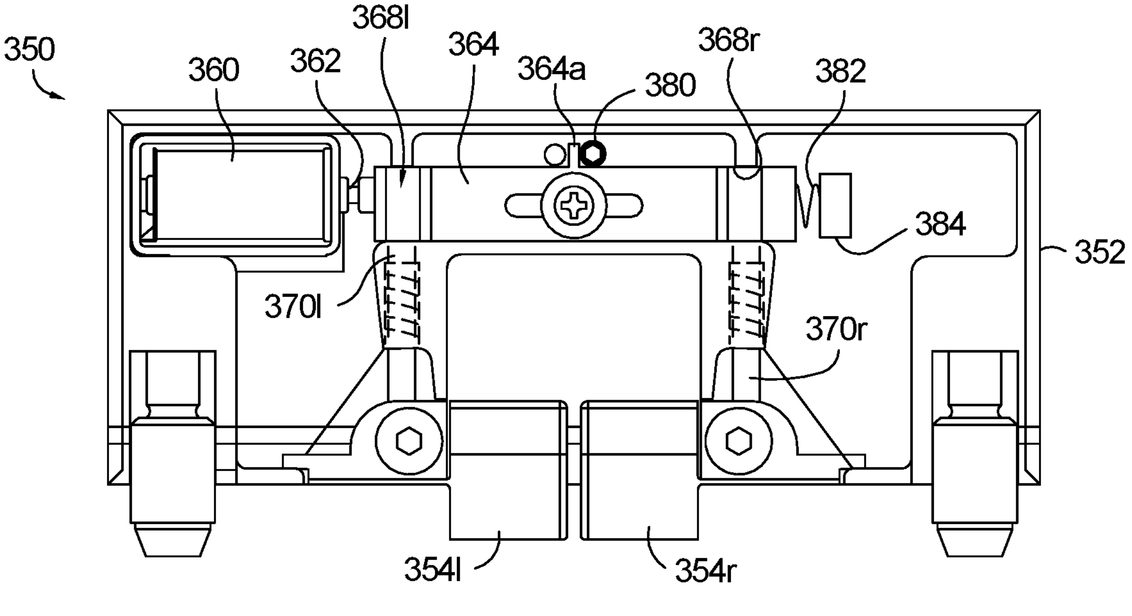
FIG. 23B is a top perspective view of the exemplary electric strike unit shown in FIG. 23A in a powered and unlocked state.
Figure 23C:
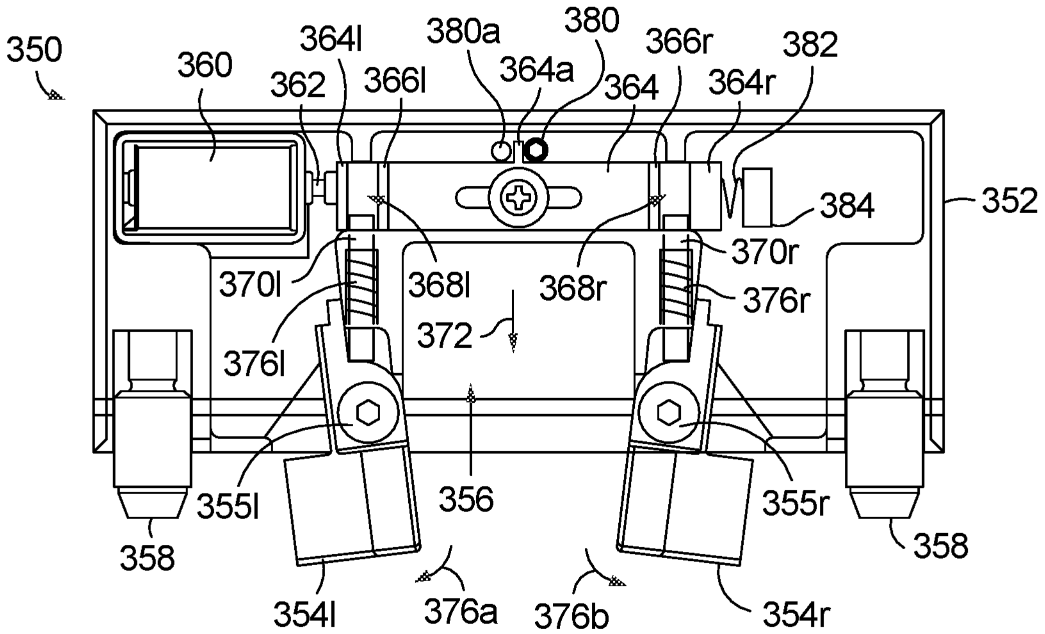
FIG. 23C is a top perspective view of the exemplary electric strike unit shown in FIG. 23B wherein a pair of keeper arms are shown in an unblocking position.

With reference to FIGS. 23A-23C, keeper assembly 350 may be placed in the "fail secure" operating mode by securing mode pin 380 in a second pin location. By way of example, mode pin 380 may be threadably received within a corresponding threaded aperture 380*b* formed on housing 352 (see FIG. 22A). As described above, slide spring 382 is positioned within spring housing 384 and is configured to provide a biasing force to drive slide block 364 toward actuator 360.

As shown in FIG. 23A, when actuator 360 is unpowered, slide spring 382 biases slide block 364 toward solenoid 360 until block end 364*l* abuts plunger 362. As a result, pins 370*l*, 370*r* align respectively with blocking member 366*l* and block end 364*r*. This alignment prevents travel of pins 370*l*, 370*r* into respective channels 368*l*, 368*r* and further prevents the pivotal rotation of keeper arms 354*l*, 354*r*.

Thus, when the actuator is unpowered, the latch is secured within cavity 356 and the door is in a closed and locked condition.

As shown in FIG. 23B, when actuator 360 is powered, plunger 362 engages block end 364*l* and drives slide bar 364 toward spring housing 384 until travel stop 364*a* engages mode pin 380. This aligns pins 370*l*, 370*r* with their respective channels 368*l*, 368*r*. As a result, keeper arms 354*l*, 354*r* may be rotated about their respective pins to allow latch 132 to released and the door to opened as described above.

While the above aspects of the present invention describe a door lock assembly for use with glass doors, it should be understood by those skilled in the art that such a door lock assembly may be used with any suitable door system, including wood and metal doors.

Furthermore, relative positional or directional terms used herein, such as for example, top, bottom, front, back, left side, right side, upward, downward, rightward, leftward, inward, outward, vertical, horizontal, clockwise, counter-clockwise, etc., may have been used in the above-referenced description to describe a positional or directional relationship among elements as the elements are presented in the drawings. However, these terms should not limit in any way a specific orientation of the referenced feature, in practice. For example, a top wall as depicted in a drawing may be thought of as a side or bottom wall if the element is oriented differently in practice.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A door lock system comprising:

a) a door latch assembly including a door latch, wherein the door latch is mounted to a door;

b) a base plate mounted to an external surface of a door frame, wherein the base plate includes at least one slot extending along a longitudinal axis of the base plate; and c) a first electric strike module having a first keeper and a housing configured to receive the door latch of the door latch assembly, wherein the first electric strike module includes at least one mating feature configured to correspondingly engage the at least one slot to selectively position the first electric strike module along the longitudinal axis of the base plate, wherein the base plate is positioned between the first electric strike module and the door frame, wherein the first electric strike module is configured to be fixedly secured to the base plate, and wherein the first keeper is positioned on the base plate to align with the door latch when the door is in a closed position to selectively secure the door relative to the door frame.

2. The system in accordance with claim 1, wherein the base plate includes at least one aperture, and wherein the system further includes a fastener that is disposed in the at least one aperture to mount the base plate to the external surface of the door frame.

3. The system in accordance with claim 1, wherein the first electric strike module is fixedly positioned to the base plate using a fastener.

4. The system in accordance with claim 1, wherein the first electric strike module has a first aperture defined therein, wherein the base plate has at least one second aperture defined therein, wherein the first aperture and the at least one second aperture are configured for being aligned with one another, and wherein a fastener is configured for being disposed in the first aperture and the at least one second aperture.

5. The system in accordance with claim 1, wherein the first electric strike module further includes at least one door bumper.

6. The system in accordance with claim 1, wherein the first electric strike module further includes an actuator assembly.

7. A method of mounting an electric strike on a door frame, the method comprising:

providing a door moveably mounted to a door frame;

providing a door latch assembly mounted to the door, wherein the door latch assembly includes a door latch;

mounting a base plate to an external surface of the door frame, wherein the base plate includes at least one slot extending along a longitudinal axis of the base plate;

providing a first electric strike module having a first keeper and a housing, wherein the first electric strike module includes at least one mating feature configured to correspondingly engage the slot;

providing at least one fastener;

selectively positioning the first electric strike module along the longitudinal axis of the base plate, wherein the at least one mating feature is engaged within the slot, and wherein the base plate is positioned between the first electric strike module and the door frame; and removably securing the first electric strike module to the base plate using the at least one fastener, wherein the first keeper is positioned to align with the door latch when the door is in a closed position to selectively secure the door relative to the door frame.

8. The method in accordance with claim 7, wherein the first electric strike module further includes at least one door bumper.

9. The method in accordance with claim 8, wherein the first electric strike module further includes an actuator assembly.

10. A surface mounted electric strike for selectively retaining a door latch of a door, wherein the door is disposed in a door frame, the electric strike comprising:

a) a housing configured to be coupled to a surface of the door frame, wherein the housing defines a cavity configured for receiving the door latch;

b) a keeper assembly mounted within the housing, the keeper assembly comprising:

i) a first keeper arm movable between a latched position and an unlatched position;

ii) a first slide pin having a first end and a second end, wherein the first end of the first slide pin is coupled to the first keeper arm;

iii) a slide bar having a first slide block end and a first blocking member, wherein a first channel is defined between the first slide block end and the first blocking member;

c) an actuating assembly configured for moving between a first mode and a second mode, wherein when the actuating assembly is in the first mode the second end of the first slide pin is engaged with the slide bar so that the first end of the first slide pin prevents the first keeper arm from moving toward the unlatched position, and wherein when the actuating assembly is in the second mode the second end of the first slide pin is permitted to be received in the first channel to allow the first keeper arm to move toward the unlatched position; and d) a pin selectively mountable to the housing in a first pin location and a second pin location, wherein the pin is in a fixed position relative to the housing when mounted in the first pin location and the second pin location, wherein when the pin is in the first pin location, the pin is not in contact with the slide bar when the actuating assembly is in the first mode, and the pin is in contact with the slide bar when the actuating assembly is in the second mode, and wherein when the pin is in the second pin location, the pin is in contact with the slide bar when the actuating assembly is in the first mode, and the pin is not in contact with the slide bar when the actuating assembly is in the second mode.

11. The surface mounted electric strike in accordance with claim 10 wherein the slide bar further includes a travel stop configured to selectively engage the pin.

12. The surface mounted electric strike in accordance with claim 11 wherein the pin is selectively mounted to the housing in the first pin location and the second pin location to place the surface mounted electric strike in either a fail-safe mode or a fail-secure mode.

13. The surface mounted electric strike in accordance with claim 11 wherein the keeper assembly further comprises:

i) a second keeper arm movable between a latched position and an unlatched position;

ii) a second slide pin having a first end and a second end, wherein the first end of the second slide pin is coupled to the second keeper arm;

iii) the slide bar having a second slide block end and a second blocking member, wherein a second channel is defined between the second slide block end and the second blocking member, wherein when the actuating assembly is in the first mode the second end of the second slide pin is engaged with the second keeper arm from moving toward the unlatched position, and wherein when the actuating assembly is in the second mode the second end of the second slide pin is permitted to be received in the second channel to allow the second keeper arm to move toward the unlatched position.

14. The surface mounted electric strike in accordance with claim 10 further comprising a spring housing and a spring configured to bias the slide bar toward the actuating assembly.

15. The surface mounted electric strike in accordance with claim 14, wherein the slide bar includes a first distal end and a second distal end, wherein the actuating assembly engages the first distal end, and wherein the spring engages the second distal end.

16. The surface mounted electric strike in accordance with claim 10 wherein the first keeper arm is pivotally mounted to the housing.

17. The surface mounted electric strike in accordance with claim 16 wherein the first keeper arm includes a pivot portion having a cammed inner face, wherein the first end of the first slide pin is coupled to the cammed inner face.

18. A door lock system comprising:

a) a door latch assembly including a door latch, wherein the door latch is mounted to a door;

b) a base plate mounted to an external surface of a door frame, wherein the base plate includes a plurality of locating features disposed on the base plate; and c) a first electric strike module having a first keeper and a housing configured to receive the door latch of the door latch assembly, wherein the first electric strike module includes at least one mating feature configured to correspondingly receive the at least one of the plurality of locating features to selectively position the first electric strike module on the base plate, wherein the base plate is positioned between the first electric strike module and the door frame, wherein the first electric strike module is configured to be fixedly secured to the base plate, and wherein the first keeper is positioned on the base plate to align with the door latch when the door is in a closed position to selectively secure the door relative to the door frame.

* * * * *